United States Patent
Chang et al.

(10) Patent No.: US 12,491,233 B2
(45) Date of Patent: Dec. 9, 2025

(54) PHARMACEUTICAL COMPOSITION, FOR PREVENTING OR TREATING CHARCOT-MARIE-TOOTH DISORDER, COMPRISING MESENCHYMAL STEM CELLS OR INSULIN SECRETED BY MESENCHYMAL STEM CELLS

(71) Applicants: SAMSUNG LIFE PUBLIC WELFARE FOUNDATION, Seoul (KR); ENCELL CO., LTD, Seoul (KR)

(72) Inventors: Jong Wook Chang, Seoul (KR); Hong Bae Jeon, Seoul (KR); Sang Eon Park, Gyeonggi-do (KR); Shin Ji Oh, Seoul (KR)

(73) Assignees: SAMSUNG LIFE PUBLIC WELFARE FOUNDATION, Seoul (KR); ENCELL CO., LTD, Seoul (KR)

( * ) Notice: Subject to any disclaimer, the term of this patent is extended or adjusted under 35 U.S.C. 154(b) by 654 days.

(21) Appl. No.: 17/912,913

(22) PCT Filed: Jan. 22, 2021

(86) PCT No.: PCT/KR2021/000941
§ 371 (c)(1),
(2) Date: Sep. 20, 2022

(87) PCT Pub. No.: WO2021/187745
PCT Pub. Date: Sep. 23, 2021

(65) Prior Publication Data
US 2023/0081894 A1    Mar. 16, 2023

(30) Foreign Application Priority Data
Mar. 20, 2020 (KR) .................. 10-2020-0034461

(51) Int. Cl.
A61K 38/28       (2006.01)
A61P 25/02       (2006.01)

(52) U.S. Cl.
CPC .............. *A61K 38/28* (2013.01); *A61P 25/02* (2018.01)

(58) Field of Classification Search
None
See application file for complete search history.

(56) References Cited

U.S. PATENT DOCUMENTS

2009/0214487 A1    8/2009    Varney et al.

FOREIGN PATENT DOCUMENTS

| KR | 10-0298763 B1 | 10/2001 |
|---|---|---|
| KR | 10-2013-0008145 A | 1/2013 |
| KR | 10-2016-0022758 A | 3/2016 |
| KR | 10-2016-0085571 A | 7/2016 |
| KR | 10-2016-0086170 A | 7/2016 |
| KR | 10-2018-0024223 A | 3/2018 |
| KR | 10-2019-0112668 A | 10/2019 |

OTHER PUBLICATIONS

Carter et al. (2008, Current Treatment Options in Neurology 10:94-102).*
Xu et al. (2004 Experimental Neurology 188:43-51).*
Boroujeni et al. (3024, International Union of Biotechnology and Molecular Biology 61(2):82-92).*
Office Action from corresponding Korean Patent Application No. 10-2023-0045495 issued on Jul. 20, 2023.
Extended European Search Report from corresponding European Patent Application No. 21772334.5 issued on Apr. 11, 2023.
Passage, E., et al.; "Ascorbic acid treatment corrects the phenotype of a mouse model of Charcot-Marie-Tooth disease", Nature Medicine, Apr. 2004;10(4)396-401.
Pavathuparambil Abdul Manaph, et al., "An overview on small molecule-induced differentiation of mesechymal stem cells into beta cells for diabetic therapy", Stem Cell Research Therapy, Sep. 23, 2019, 10(1) 293, pp. 1-18.
Xu, W., et al.; "DHTKD1 Deficiency Causes Charcot-Marie-Tooth Disease in Mice", Mol Cell Biol, Jun. 14, 2018;38(13)e00085-18., pp. 1-14.
Park, S., et al.; "320-Restoration of neuromuscular function in charcot-marie-tooth (CMT) 1a disease by human tonsil-derived MSC (T-MSC)", Cytotherapy vol. 19, issue 5, Supplement, May 2017, p. S229.
Park, Saeyoung, et al.; "Differentiation of human tonsil-derived mesenchymal stem cells into schwann-like cells improves neuromuscular function in a mouse model of charcot-marie-tooth disease time 1A", International Journal of Molecular Science, Aug. 14, 2018, vol. 19, article No. 2393, inner p. 1-16.
Leal, Alejandro, et al.; "Immune effects of mesenchymal stem cells: implications for charcot-marie-tooth disease", Cellular Immunology, Jul. 15, 2008, vol. 253, pp. 11-15.
International Search Report from corresponding PCT Application No. PCT/KR2021/000941, dated May 17, 2021.

* cited by examiner

*Primary Examiner* — Elizabeth C. Kemmerer
(74) *Attorney, Agent, or Firm* — Harness, Dickey & Pierce, P.L.C.

(57) ABSTRACT

The present invention relates to a pharmaceutical composition, for preventing or treating Charcot-Marie-Tooth disorder, comprising mesenchymal stem cells or insulin secreted by mesenchymal stem cells.

5 Claims, 28 Drawing Sheets

PHARMACEUTICAL COMPOSITION, FOR PREVENTING OR TREATING CHARCOT-MARIE-TOOTH DISORDER, COMPRISING MESENCHYMAL STEM CELLS OR INSULIN SECRETED BY MESENCHYMAL STEM CELLS

CROSS-REFERENCE TO RELATED APPLICATIONS

This application is a national phase application of PCT Application No. PCT/KR2021/000941, filed on Jan. 22, 2021, which claims priority to Korean Patent Application No. 10-2020-0034461, filed on Mar. 20, 2020. The entire disclosures of the applications identified in this paragraph are incorporated herein by reference.

TECHNICAL FIELD

The present disclosure was made with the support of the Ministry of Health and Welfare, Republic of Korea, under Project No. HI14C3484, which was conducted in the research project named "GMP Production and Development of Novel Techniques for Regenerative Stem Cell Therapies" in the research program titled "Research-Driven Hospital Fostering R&D" by Samsung Seoul Hospital under management of the Korea Health Industry Development Institute, from 1 Jan. 2020 to 31 Dec. 2020.

The present disclosure was also made with the support of the Internal Project of Samsung Seoul Hospital, under Project No. GFO3190121, which was conducted in the research project named "Development of Customized Diagnosis and Treatment Methods for Charcot-Marie-Tooth Disease" in the research program titled "20*20 PROJECT" by Samsung Seoul Hospital under management of Samsung Seoul Hospital, from 1 Jan. 2014 to 31 Dec. 2020.

The present disclosure was also made with the support of the Korea Technology and Information Promotion Agency for Small and Medium Enterprises, Republic of Korea, under Project No. S2644635, which was conducted in the research project named "Development of Next-Generation Medicines for Rare Muscular Disease using Enhanced Neo Cell" in the research program titled "Technology-Based Startups and Investments Linkage" by ENCELLS Co., Ltd under management of Korea Business Angels Association, from 1 Aug. 2018 to 31 Jul. 2020.

The present invention relates to a pharmaceutical composition containing mesenchymal stem cells or insulin secreted from mesenchymal stem cells for preventing or treating Charcot-Marie-Tooth disease.

BACKGROUND ART

Mesenchymal stem cells, which are stromal origin cells with self-renewal capacity, can differentiate into bone, cartilage, adipose tissue, muscle, tendon, ligament, nervous tissue, and the like and thus are receiving attention as suitable cells for cell therapy.

Currently, bone marrow may be one of the most representative origin tissues from which mesenchymal stem cells can be harvested. However, mesenchymal stem cells present in the bone marrow have only limited applications due to their restrictive differentiation and proliferation potencies, and the restrictions due to the bone marrow origin cause several steps of procedures and complicated operations and thus usually give temporal, mental, and physical pains to subjects of collection. Moreover, for bone marrow transplantation, a donor needs to be found who has antigens identical to those of a patient through a comparison of histocompatibility antigens to thereby exclude graft versus host reaction.

Unlike the bone marrow, the umbilical cord can be obtained through a simple procedure during childbirth, and contains numerous hematopoietic stem cells and stem cells for its volume. In recent years, research thereon is being actively conducted as the umbilical cord, placenta, umbilical cord blood, and the like contain a large quantity of stem cells. It has not yet been reported that mesenchymal stem cells isolated and cultured from the umbilical cord or factors secreted from the mesenchymal stem cells inhibit muscle cell death.

Inherited peripheral neuropathy (IPN) includes Charcot-Marie-Tooth disease (CMT) also called hereditary motor and sensory neuropathy (HMSN), hereditary neuropathy with liability to pressure palsy (HNPP), hereditary motor neuropathy (HMN), and hereditary sensory and autonomic neuropathy (HSAN).

Charcot-Marie-Tooth disease is an inherited neuromuscular disease associated with various gene mutations that cause axonal degeneration of peripheral nerves. The main clinical features are muscle loss and sensory loss in the center of the distal part of arms and legs. It has been reported that there may be various clinical curses of diseases in not only several subtypes but also even the same subtype, and therefore, close monitoring for patients is needed.

Charcot-Marie-Tooth disease, which is the most frequently occurring IPN with a frequency of 1 in 2,500 people, is symmetrical distal polyneuropathy, having clinical features, such as muscular atrophy, weakness, foot deformities, and sensory loss in the legs, as the disease progresses.

More than 80 relevant genes causing Charcot-Marie-Tooth disease have been isolated. Out of these, the most main causative genes include peripheral myelin protein 22 (PMP22), myelin protein zero (MPZ), gap junction protein beta 1 (GJB1), and mitofusin 2 (MFN2), which account for approximately 90% of the CMT cases. These genes cause disease in an autosomal dominant or X-linked dominant manner. At least 95% of the CMT cases are dominantly inherited, whereas very few cases are inherited in an autosomal recessive or X-linked recessive manner. Although the majority of the autosomal dominant cases are caused by duplication of a PMP22 gene, at least 50% of the cases are caused by point mutations in 40 or more genes.

Clinically applicable methods of treating genetically recessive diseases include gene therapy, enzyme replacement, cell transplantation, and the like, but these clinical approaches are limited in autosomal dominant cases, which are caused by gain-of-function mutations of mutant proteins. Although various strategies have been proposed to bypass the detrimental effect of the mutant proteins, fundamental therapeutic methods should be based on the suppression or the removal of mutant alleles or proteins.

DISCLOSURE OF INVENTION

Technical Problem

The present inventors confirmed that mesenchymal stem cells or insulin secreted from mesenchymal stem cells has an effect of promoting proliferation potency of Schwann cells, and completed a medicine for Charcot-Marie-Tooth disease by using a mechanism of restoration of myelination through the effect.

Accordingly, an aspect of the present invention is to provide a pharmaceutical composition containing mesenchymal stem cells or insulin secreted from mesenchymal stem cells for preventing or treating Charcot-Marie-Tooth disease.

Another aspect of the present invention is to provide a pharmaceutical composition containing insulin or a derivative thereof as an active ingredient for preventing or treating Charcot-Marie-Tooth disease.

Still another aspect of the present invention is to provide a stem cell therapeutic agent containing mesenchymal stem cells or insulin secreted from mesenchymal stem cells for treating Charcot-Marie-Tooth disease.

Solution to Problem

The present invention is directed to a pharmaceutical composition containing mesenchymal stem cells or insulin secreted from mesenchymal stem cells for preventing or treating Charcot-Marie-Tooth disease.

Hereinafter, the present disclosure will be described in more detail.

An aspect of the present invention is directed to a pharmaceutical composition containing mesenchymal stem cells for preventing or treating Charcot-Marie-Tooth disease.

As used herein, the term "mesenchymal stem cells" refers to pluripotent progenitor cells before differentiation into cells of specific organs, such as bone, cartilage, fat, tendon, nerve tissue, fibroblasts, and muscle cells.

In the present invention, the mesenchymal stem cells may have insulin secretory capacity.

In the present invention, the mesenchymal stem cells may contain insulin.

In the present invention, insulin may be secreted from the mesenchymal stem cells, but is not limited thereto.

In the present invention, the mesenchymal stem cells may be contained in an undifferentiated state in the composition.

In the present invention, the mesenchymal stem cells may be derived from a human or a non-human mammal, for example, may be derived from a human fetus.

In the present invention, examples of the non-human mammal may include a dog, a cat, a monkey, cattle, a sheep, a pig, a horse, a rat, a mouse, or a guinea pig, but is not limited thereto.

In the present invention, the mesenchymal stem cells may be derived from tonsils, umbilical cord, embryonic yolk sac, placenta, umbilical cord blood, skin, peripheral blood, bone marrow, adipose tissue, muscle, liver, neural tissue, periosteum, fetal membrane, synovial membrane, synovial fluid, amniotic membrane, meniscus, anterior cruciate ligament, articular chondrocytes, deciduous teeth, pericytes, trabecular bone, infra patellar fat pad, spleen, thymus, and the like, and for example, may be derived from human tonsils or human umbilical cord.

In the present invention, the isolation method of mesenchymal stem cells are known in the art, and for example, mesenchymal stem cells may be isolated and purified from tonsils, umbilical cord, embryonic yolk sac, placenta, umbilical cord blood, skin, peripheral blood, bone marrow, adipose tissue, muscle, liver, neural tissue, periosteum, fetal membrane, synovial membrane, synovial fluid, amniotic membrane, meniscus, anterior cruciate ligament, articular chondrocytes, deciduous teeth, pericytes, trabecular bone, infra patellar fat pad, spleen, thymus, and the like, but is not limited thereto.

In the present invention, the isolated mesenchymal stem cells may be cultured as needed.

In the present invention, the mesenchymal stem cells may be injected into the living body of a patient as cells alone or while cultured in an incubator. For example, a clinical method reported by Lindvall et al. (1989, Arch. Neurol. 46: 615-31) or Douglas Kondziolka (Pittsburgh, 1998) may be used, but is not limited thereto.

The mesenchymal stem cells defined by the International Society for Cellular Therapy (ISCT) need to be grown while attached to the bottom in culture conditions, be capable of differentiating into osteoblasts, adipocytes, or chondrocytes in vitro, have the expression of the cell surface markers CD73, CD90, CD105, CD166, and CD44 (positive markers), and have no expression of the cell surface markers CD34, CD45, CD19, CD11b, CD14, and HLA-DR (negative markers).

Preparations may contain, in addition to the mesenchymal stem cells, a pharmaceutically acceptable typical carrier, wherein a preservative, a pain relief agent, a solubilizer, or a stabilizer may be contained for an injection, and a base, an excipient, a lubricant, or a preservative may be contained for a preparation for topical administration.

In the present invention, the pharmaceutical composition may further contain a pharmaceutically acceptable carrier, and the carrier is commonly used at the time of formulation. Examples of the carrier may include lactose, dextrose, sucrose, sorbitol, mannitol, starch, acacia gum, calcium phosphate, alginate, gelatin, calcium silicate, microcrystalline cellulose, polyvinyl pyrrolidone, cellulose, water, syrup, methyl cellulose, methyl hydroxybenzoate, propyl hydroxybenzoate, talc, magnesium stearate, mineral oils, and the like, but are not limited thereto.

In the present invention, the pharmaceutical composition may further contain, in addition to the above ingredients, a lubricant, a humectant, a sweetener, a flavor, an emulsifier, a suspending agent, a preservative, and the like, but is not limited thereto.

The pharmaceutical composition of the present invention may be prepared in a unit dosage form or enclosed in a multi-dose container using a pharmaceutically acceptable carrier and/or excipient according to a method easily carried out by a skilled having ordinary skill in the technical field to which the present invention pertains. The formulation may be a solution in oil or aqueous medium, a suspension, or an emulsion, and may further contain a dispersant or a stabilizer.

The pharmaceutical composition of the present invention may be administered parenterally, administered intravenously, subcutaneously, intraperitoneally, or topically, and preferably administered directly to the site of a lesion.

A composition for parenteral administration (e.g., an injectable solution) of the pharmaceutical composition according to the present invention may be injected in vivo by dispersion and/or dissolution in a pharmaceutically acceptable carrier, for example, sterile purified water, a buffer of about pH 7, or saline solution. The pharmaceutical composition may contain a typical additive such as a preservative or a stabilizer, as needed, but is not limited thereto.

The formulation of the pharmaceutical composition according to the present invention may vary depending on the method of use. The pharmaceutical composition according to the present invention may be prepared as plasters, granules, powders, syrups, solutions, fluid extracts, emulsions, suspension, infusions, tablets, injections, capsules, pills, and the like, but is not limited thereto.

The appropriate formulation of the pharmaceutical composition according to the invention depends on the selected route of administration. Any of the known techniques, carriers, and excipients may be used suitably and as understood in the art, for example, Remington's Pharmaceutical Sciences described above.

The amount of mesenchymal stem cells injected in the present invention may be $10^3$ to $10^{10}$ cells/injection, preferably $10^3$ to $10^9$ cells/injection, and most preferably $5\times10^4$ cells/injection, but is not limited thereto.

The amount of insulin injected in the present invention may be 0.0001 ng to 500 mg/injection, and preferably 0.0001 mg to 200 mg/injection, but is not limited thereto.

The dosage of the pharmaceutical composition of the present invention may be variously prescribed by factors, such as the method of formulation, manner of administration, patient's age, body weight, gender, and disease morbidity, food, time of administration, route of administration, excretion rate, and response sensitivity.

As used herein, the term "prevention" may refer to any action that inhibits or delays the progression of Charcot-Marie-Tooth disease by administration of the pharmaceutical composition according to the present invention.

As used herein, the term "treatment" refers to any action that alleviates or beneficially changes Marie-Tooth disease by administration of the pharmaceutical composition according to the present invention.

Another aspect of the present invention is directed to a pharmaceutical composition for preventing or treating Charcot-Marie-Tooth disease, the pharmaceutical composition containing insulin or a derivative thereof as an active ingredient.

In the present invention, insulin may naturally occur or may be derived from mesenchymal stem cells, but is not limited thereto.

In the present invention, the naturally occurring insulin usually includes insulins having wild-type amino acid sequences of insulins associated with animals, but is not limited thereto.

In the present invention, the naturally occurring insulin includes variants of the naturally occurring insulin, but is not limited thereto.

In the present invention, insulin may include, without limitation to, proteins or analogs, derivatives, and mutants thereof that are recombined by methods known in the art as long as they have biological activity to achieve an effect of preventing or treating Charcot-Marie-Tooth disease.

In the present invention, the mutation may be a mutation found in nature or an artificial mutation with or without an effect of substituting, deleting, or inserting at least one amino acid with respect to a nucleic acid sequence encoding insulin.

In the present invention, the mutation may have a conservative amino acid substitution that does not affect insulin expression, and may include 80%, 85%, 90%, 95%, 96%, 97%, 98%, 99%, or 100% identity with the amino acid sequence of native insulin.

In the present invention, insulin includes those composed of polypeptide variants resulting from fragmentation, deletion, truncation, or the like, and may be a fragment in which an amino acid residue is removed from native insulin. Such fragmentation, deletion, truncation, and the like do not substantially adversely affect the activity of the resultant polypeptides. In a specific aspect, activation domains of insulin can be derived through mapping of protein domains of insulin or truncation from the C-terminus, the N-terminus, or both of the C-terminus and the N-terminus, and such a truncated polypeptide may not substantially adversely affect activity or may show the increase of activity.

As used herein, the term "recombinant" when used with reference to a cell typically indicates that the cell has been modified by the introduction of a foreign nucleic acid sequence or that the cell is derived from a cell so modified. For example, a recombinant cell may comprise a gene not found in identical form within the native (non-recombinant) form of the cell, or a recombinant cell may comprise a native gene (found in the native form of the cell) but which has been modified and re-introduced into the cell. A recombinant cell may comprise a nucleic acid endogenous to the cell that has been modified without removing the nucleic acid from the cell; such modifications include those obtained by gene replacement, site-specific mutation, and related techniques known to those of ordinary skill in the art. Recombinant DNA technology includes techniques for the production of recombinant DNA in vitro and transfer of the recombinant DNA into cells where it may be expressed or propagated, thereby producing a recombinant polypeptide. The terms "recombination," "recombining," and "recombined" of polynucleotides or nucleic acids refer generally to the assembly or combining of two or more nucleic acid or polynucleotide strands or fragments to generate a new polynucleotide or nucleic acid. The recombinant polynucleotide or nucleic acid is sometimes referred to as a chimera. A nucleic acid or polypeptide is "recombinant" when it is artificial or engineered.

The recombinant insulin may include any member derived from a primate, human, monkey, rabbit, pig, rodent, mouse, rat, hamster, gerbil, canine, or feline, and biologically active derivatives thereof. Mutant and modified insulin having activity are also included, as are functional fragments and fusion proteins of insulin.

As used herein, the term "derivative" may include at least one insulin in which a part of the structure of insulin is substituted with another atomic group, substituent, or the like or combined or fused with another biological substance, and includes proteins modified by the protein modification methods known in the art.

In the present invention, at least one insulin having a linkage with another biological substance may be insulin fusion proteins obtained by fusion to antibodies, fragments of antibodies, immunoglobulins, peptides, enzymes, growth factors, cytokines, transcription factors, toxins, antigenic peptides, hormones, transport proteins, motor function proteins, receptors, signaling proteins, storage proteins, membrane proteins, transmembrane proteins, internal proteins, external proteins, secreted proteins, viral proteins, sugar proteins, truncated proteins, protein complexes, chemically modified proteins, and the like.

In the present invention, the biological substance includes, without limitation, a variety of mall peptides, other proteins, and chemical means (e.g., tags) useful for isolating or identifying bound polypeptides.

In the present invention, the biological substance may be fused to the N-terminus and/or C-terminus of the amino acid sequence of insulin and may be prepared by a method known in the art.

In an embodiment of the present invention, some fusion domains that can be fused with insulin are particularly useful for isolation of fusion proteins by affinity chromatography. For the purpose of affinity purification, relevant matrices for affinity chromatography, such as glutathione-, amylase-, and nickel- or cobalt-conjugated resins are used. A plurality of such matrices are available in "kit" form, such as the Pharmacia GST purification system and the QLAexpress™ system (Qiagen) useful with (HIS6) fusion partners.

As another example, a fusion domain may be selected so as to facilitate detection of insulin. Examples of such detection domains include various fluorescent proteins (e.g., GFP) as well as "epitope tags", which are usually short peptide sequences for which a specific antibody is available. Well known epitope tags for which specific monoclonal antibodies are readily available include FLAG, influenza virus haemagglutinin (HA), and c-myc tags. In some cases, the fusion domains have a protease cleavage site, such as for Factor Xa or Thrombin, which allows the relevant protease to partially digest the fusion proteins and thereby liberate the recombinant proteins therefrom. The liberated proteins can then be isolated from the fusion domain by subsequent chromatographic separation.

Examples of the domains may additionally include Arg-tag, Strep-tag, S-tag, calmodulin-binding peptide, cellulose-binding domain, SBP-tag, chitin-binding domain, glutathione S-transferase-tag, maltose-binding protein, NusA, TrxA, DsbA, protein A, protein G, human albumin, and the like.

In an embodiment of the present invention, insulin may be fused with an insulin-stabilizing domain ("stabilizer" domain) in vivo.

As used herein, the term "stabilizing" means anything that increases serum half-life, regardless of whether this is because of decreased destruction, decreased clearance by the kidney, or other pharmacokinetic effect.

The fusion with the Fc portion of an immunoglobulin is known to confer desirable pharmacokinetic properties on a wide range of proteins. Likewise, the fusion to human serum albumin can confer desirable properties. Other types of fusion domains that may be selected include multimerizing (e.g., dimerizing, tetramerizing) domains and functional domains (that confer an additional biological function, as desired). Fused bodies may be constructed such that the heterologous peptide is fused at the amino terminus of insulin and/or at the carboxy terminus of insulin.

In one specific aspect of the invention, the amino acid sequence of insulin may be a recombinant polypeptide, native polypeptide, or synthetic polypeptide containing a fragment thereof. In some embodiments, the polypeptide is a multimer. In some embodiments, the polypeptide is a dimer. It will be recognized in the art that some amino acid sequences of the binders described herein may be varied without significant effect on the structure or function of the protein. Thus, the present invention further includes variations of insulin which show substantial activity or include regions of fragments thereof. In some embodiments, amino acid sequence variations include deletions, insertions, inversions, repeats, and/or other types of substitutions.

In the present invention, insulin may be usually modified to contain additional chemical moieties that are not a part of the polypeptide. The derivatizing moieties may improve or otherwise modulate the solubility, biological half-life and/or absorption of the polypeptides. The moieties may also reduce or eliminate undesirable side effects of polypeptides and variants. An overview of chemical moieties can be found in literature [Remington: The Science and Practice of Pharmacy, 22st Edition, 2012, Pharmaceutical Press, London].

The insulin of the present invention may be further combination with a bioactive compound to enhance the therapeutic effect.

In the present invention, the term "bioactive compound" refers to a compound that modifies a disease when applied to a mammal having the disease. A bioactive compound may have antagonistic or agonistic properties and may be a proteinaceous bioactive compound or a non-proteinaceous bioactive compound.

The pharmaceutical composition of the present invention may be used alone or in combination with surgery, radiotherapy, hormone therapy, chemotherapy, and methods using biological response modulators, for prevention and/or treatment of Charcot-Marie-Tooth disease, but is not limited thereto.

Still another aspect of the present invention is directed to a stem cell therapeutic agent, containing mesenchymal stem cells, for treatment of Charcot-Marie-Tooth disease.

In the present invention, the mesenchymal stem cells may have insulin secretory capacity.

In the present invention, the mesenchymal stem cells may contain insulin.

In the present invention, insulin may be secreted from mesenchymal stem cells, but is not limited thereto.

In the present invention, the mesenchymal stem cells may be contained in an undifferentiated state in stem cell therapeutic agents.

In the present invention, the mesenchymal stem cells may be derived from a human or a non-human mammal, for example, may be derived from a human fetus.

In the present invention, examples of the non-human mammal may include a dog, a cat, a monkey, cattle, a sheep, a pig, a horse, a rat, a mouse, or a guinea pig, but is not limited thereto.

In the present invention, the mesenchymal stem cells may be derived from tonsils, umbilical cord, embryonic yolk sac, placenta, umbilical cord blood, skin, peripheral blood, bone marrow, adipose tissue, muscle, liver, neural tissue, periosteum, fetal membrane, synovial membrane, synovial fluid, amniotic membrane, meniscus, anterior cruciate ligament, articular chondrocytes, deciduous teeth, pericytes, trabecular bone, infra patellar fat pad, spleen, thymus, and the like, and for example, may be derived from human tonsils or human umbilical cord.

As used herein, the term "cell therapeutic agent" refers to a medicine (Article 2 of the Regulations for Approval and Review of Biological Products established by KFDA, Notification No. 2008-78) used for the purpose of treatment, diagnosis, and prevention through a series of acts of in vitro proliferating or selecting live autologous, allogenic, or xenogenic cells or changing biological properties of the cells in several manners to restore the function of cells and tissues.

Terms not otherwise defined herein have the meanings commonly used in the technical field to which the present disclosure pertains.

Advantageous Effects of Invention

The present invention is directed to a pharmaceutical composition for preventing or treating Charcot-Marie-Tooth disease, the pharmaceutical composition containing mesenchymal stem cells or insulin secreted from mesenchymal stem cells, wherein the mesenchymal stem cells or insulin secreted from mesenchymal stem cells can prevent or treat Charcot-Marie-Tooth disease by a mechanism of restoration of myelination through an effect of promoting proliferation potency of Schwann cells.

BEST MODE FOR CARRYING OUT THE INVENTION

A pharmaceutical composition containing mesenchymal stem cells for preventing or treating Charcot-Marie-Tooth disease

MODE FOR CARRYING OUT THE INVENTION

Hereinafter, the present disclosure will be described in more detail by the following examples. However, these exemplary embodiments are used only for illustration, and the scope of the present disclosure is not limited by these exemplary embodiments.

Example 1: Stemness of Tonsil-Derived Mesenchymal Stem Cells

To examine stemness of tonsil-derived mesenchymal stem cells, cell surface marker analysis was performed.

Specifically, tonsil-derived mesenchymal stem cells were cultured in α-MEM containing FBS at 37° C., saturated humidity, and 5% $CO_2$ and harvested at 80% confluence. The harvested cells were analyzed for expression patterns of mesenchymal stem cell-specific cell surface markers (CD90, CD105, CD73, CD166, and CD44) according to the criteria of the International Society for Cell Therapy (ISCT), and for purity analysis, cells expressing negative markers (CD34, CD45, CD19, CD11b, CD14, and HLA-DR) of mesenchymal stem cells were analyzed by flow cytometry. The results are shown in FIG. 1.

Figure 1:
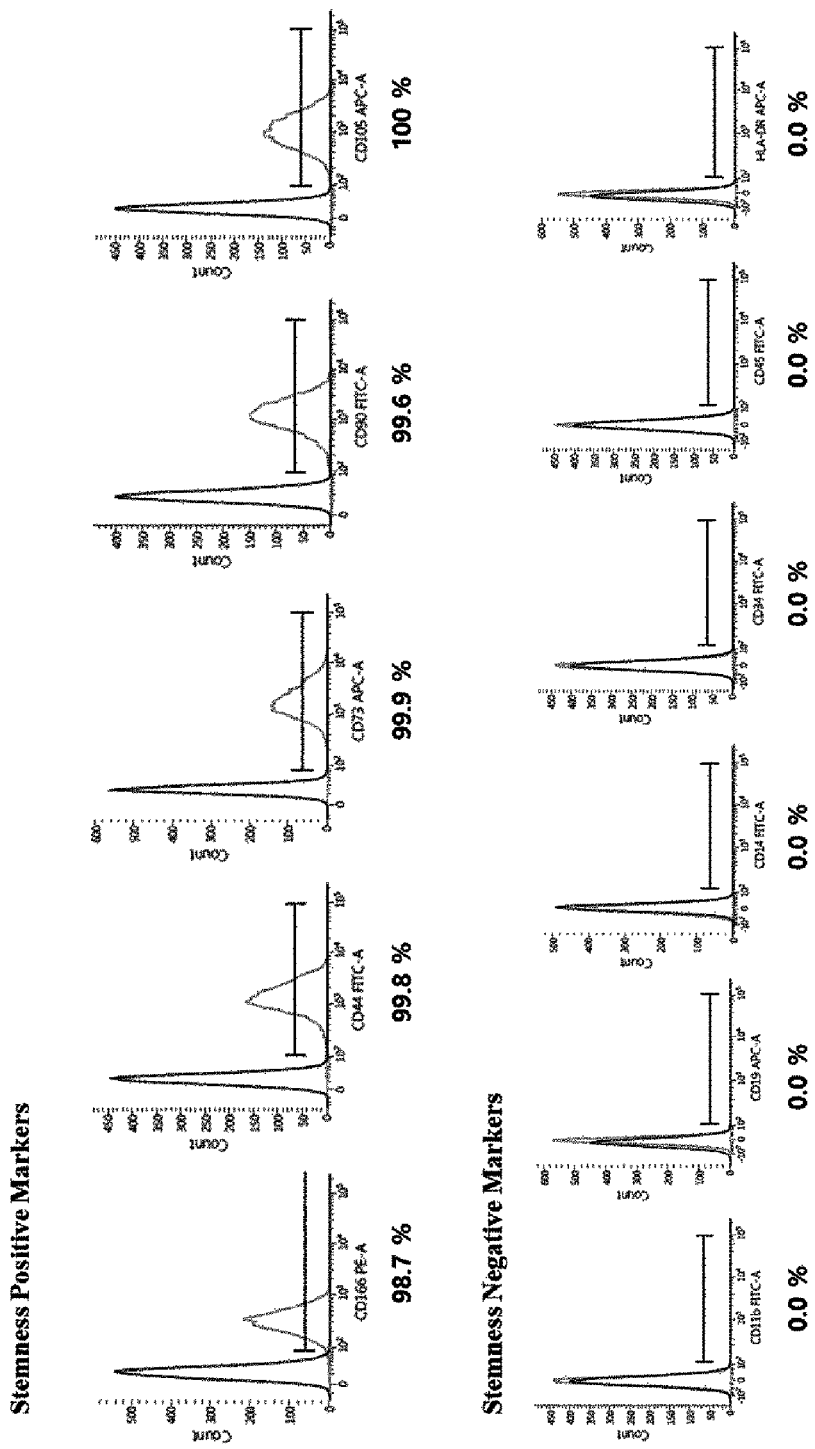
FIG. 1 illustrates graphs showing the analysis results of stemness of mesenchymal stem cells isolated from tonsils according to an example of the present invention.
Figure 2A:
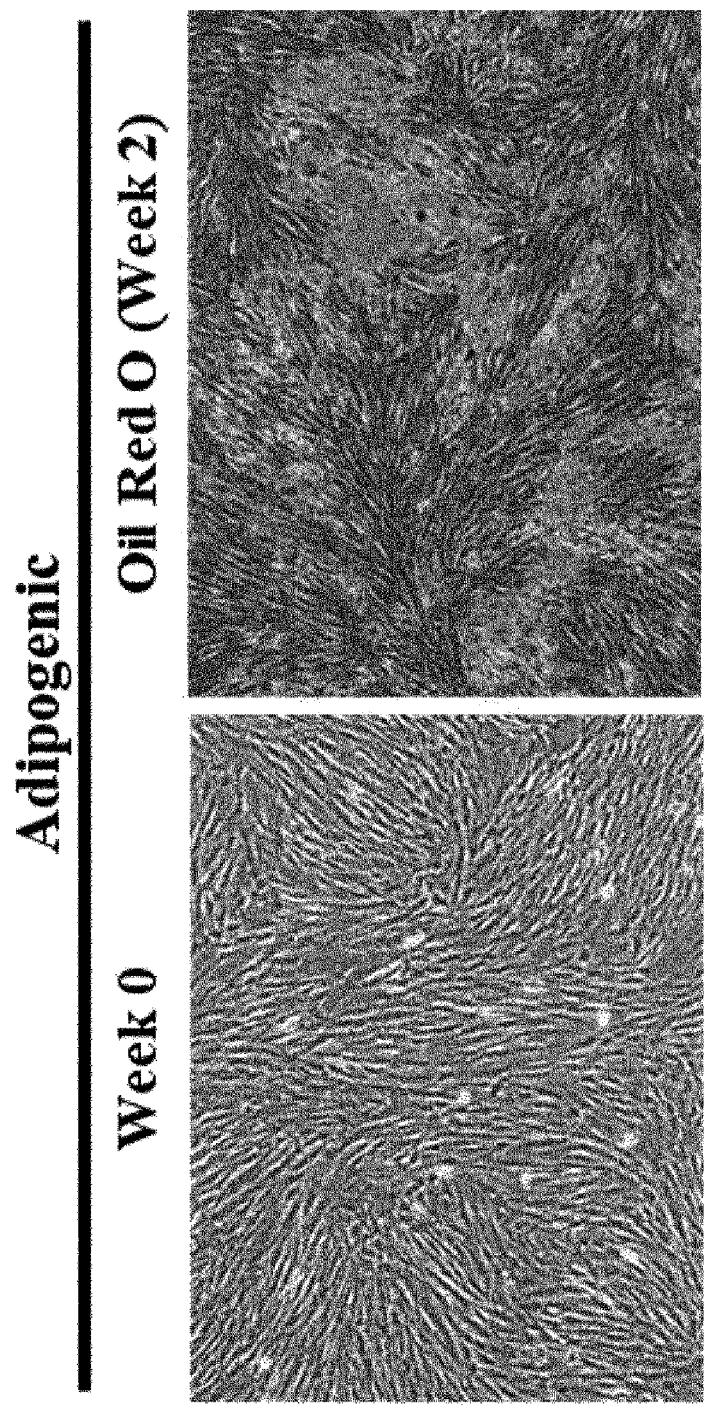
FIG. 2A illustrates images confirming the potency to differentiate into adipocytes according to an example of the present invention.
Figure 2B:
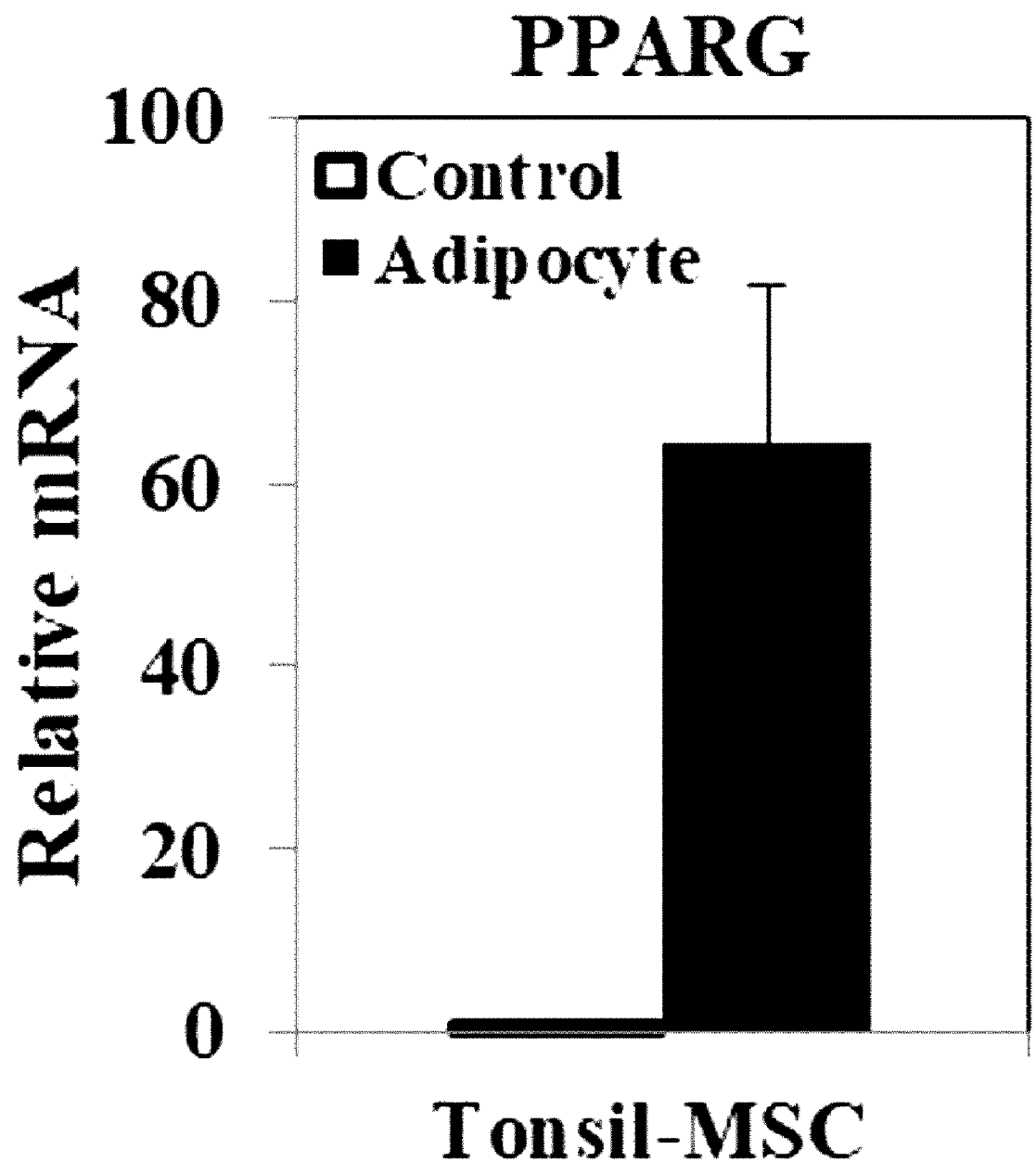
FIG. 2B illustrates a graph confirming the potency to differentiate into adipocytes according to an example of the present invention.
Figure 2C:
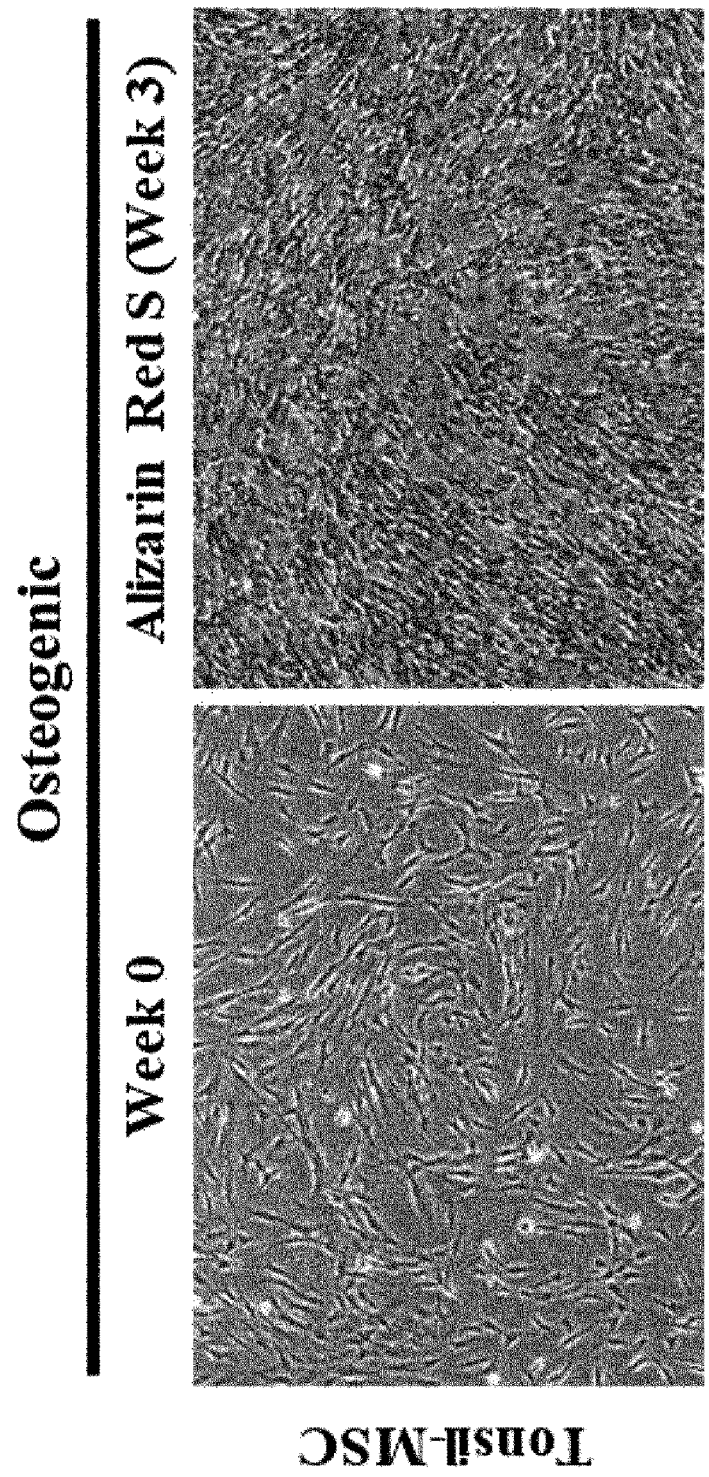
FIG. 2C illustrates images confirming the potency to differentiate into osteoblasts according to an example of the present invention.
Figure 2D:
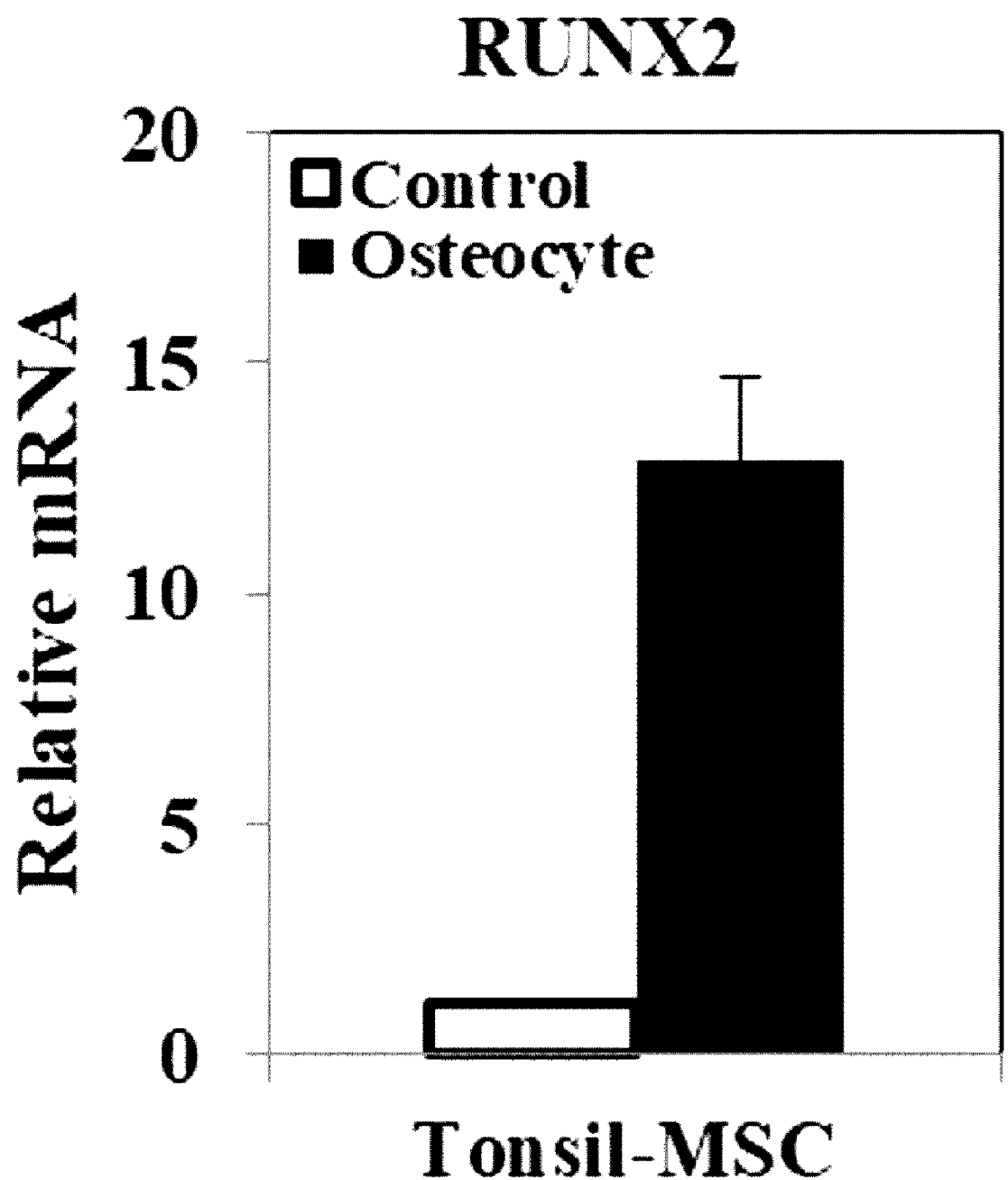
FIG. 2D illustrates a graph confirming the potency to differentiate into osteoblasts according to an example of the present invention.
Figure 2E:
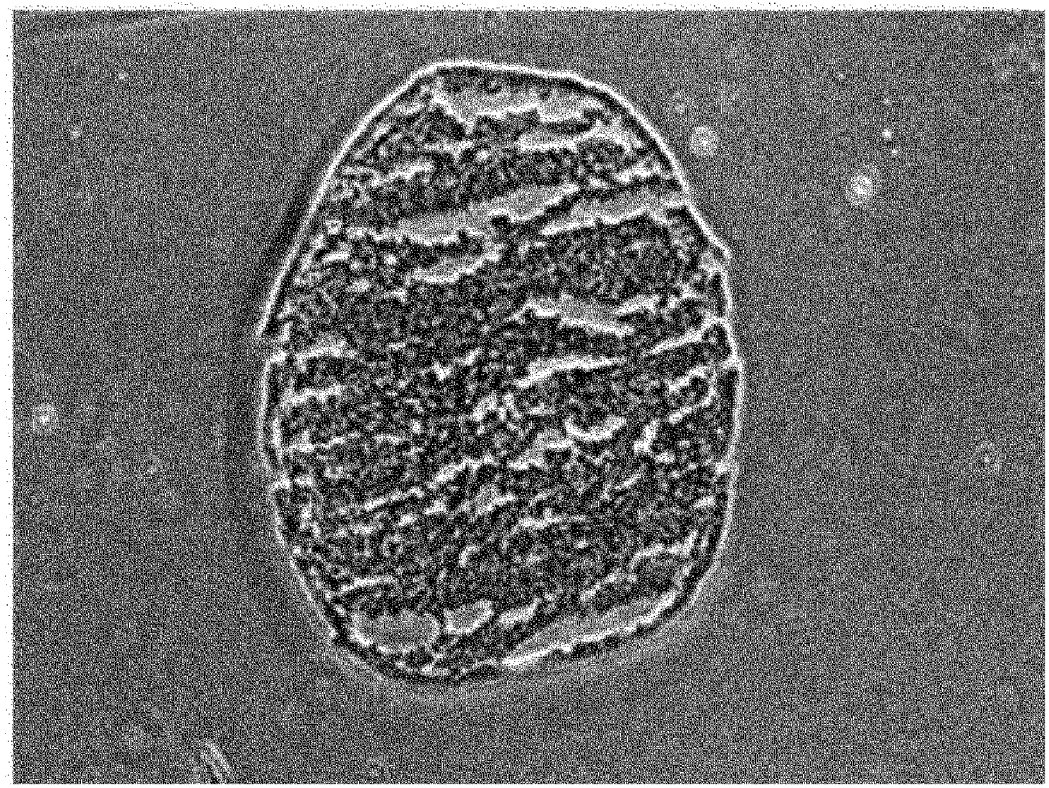
FIG. 2E illustrates images confirming the potency to differentiate into chondrocytes according to an example of the present invention.

As can be confirmed from FIG. 1, the tonsil-derived mesenchymal stem cells expressed mesenchymal stem cell-specific cell surface markers by 95% or more, and the negative markers of mesenchymal stem cells were not expressed, indicating that the tonsil-derived mesenchymal stem cells were mesenchymal stem cells.

Example 2: Differentiation Potency of Tonsil-Derived Mesenchymal Stem Cells into Adipocytes, Osteoblasts, or Chondrocytes The tonsil-derived mesenchymal stem cells after culturing were induced to differentiate by using differentiation media for differentiation into adipocytes, osteoblasts, or chondrocytes, as representative mesenchymal stem cells, respectively.

Specifically, tonsil-derived mesenchymal stem cells were cultured in α-MEM containing FBS at 37° C., saturated humidity, and 5% $CO_2$ and harvested at 80% confluence. The harvested cells were cultured in differentiation media for differentiation into adipocytes, osteoblasts, or chondrocytes for 10 to 30 days, and then it was examined whether the mesenchymal stem cells were differentiated into each type of cells.

The StemPro Adipogenesis Differentiation Kit was used for adipocyte differentiation; the Stem Pro Osteogenesis Differentiation Kit was used for osteoblast differentiation; and media containing BMP-6, TGFβ3, ITS, dexamethasone, ascorbic acid, L-proline, and sodium pyruvate in DMEM were used for chondrocyte differentiation.

The adipocytes were stained with oil-red O; the osteoblasts were stained with Alizarin Red S; and the chondrocytes were stained with Safranin-O. The results are shown in FIGS. 2A to 2D.

In addition, it was examined using qRT-PCR analysis whether specific genes observable in each type of differentiated cells were expressed in differentiated adipocytes and chondrocytes. Non-differentiated cells and differentiated cells were harvested and the total RNA was extracted from the cell pellets using TRIZOL. The pellets were completely dissolved in 1 mL of TRIZOL, and then 0.2 mL of chloroform was added thereto, followed by shaking for 15 seconds and then standing at room temperature for 3 minutes. The resultant product was then separated into the bottom layer phenol-chloroform, the intermediate layer, and the upper layer colorless aqueous solution by centrifugation at 13,000 rpm and 4° C. for 15 minutes, and of these, only the upper layer colorless aqueous solution was separately collected and transferred into a new tube. After 0.5 mL of isopropyl alcohol was added to the tube and then vigorously mixed, the mixture was left at room temperature for 5 minutes. The resultant solution was again centrifuged at 13,000 rpm and 4° C. for 10 minutes, and the supernatant was discarded. Thereafter, 75% ethanol was added to pellets and again vigorously mixed, followed by centrifugation. The upper layer was discarded, and RNA pellets were dried for 5-10 minutes and dissolved in RNase-free water.

As for cDNA synthesis, 1 μg of RNA was incubated at 65° C. for 5 minutes, 23° C. for 10 minutes, 55° C. for 10 minutes, and 80° C. for 10 minutes by using the SuperScript IV Reverse Transcriptase Kit (Invitrogen).

It was confirmed that when 1 μg of synthesized cDNA was subjected to qRT-PCR with primers of PPARG (adipocytes) and RUNX2 (chondrocytes), the expression of differentiation genes was increased by about 60% and about 13% in the differentiated cells compared with the undifferentiated cells, respectively.

It could be seen that tonsil-derived mesenchymal stem cells were differentiated into adipocytes, osteoblasts, or chondrocytes as mesenchymal stem cells under appropriate differentiation media.

TABLE 1

| PPARG | |
| --- | --- |
| Control | 1 |
| Adipocyte | 64.5 |

TABLE 2

| RUNX2 | |
| --- | --- |
| Control | 1 |
| Osteocyte | 12.9 |

As can be confirmed from FIGS. 2A to 2D, the potency of tonsil-derived mesenchymal stem cells to differentiate into adipocytes, osteoblasts, and chondrocytes was confirmed, indicating that the tonsil-derived mesenchymal stem cells were mesenchymal stem cells.

Figure 3A:
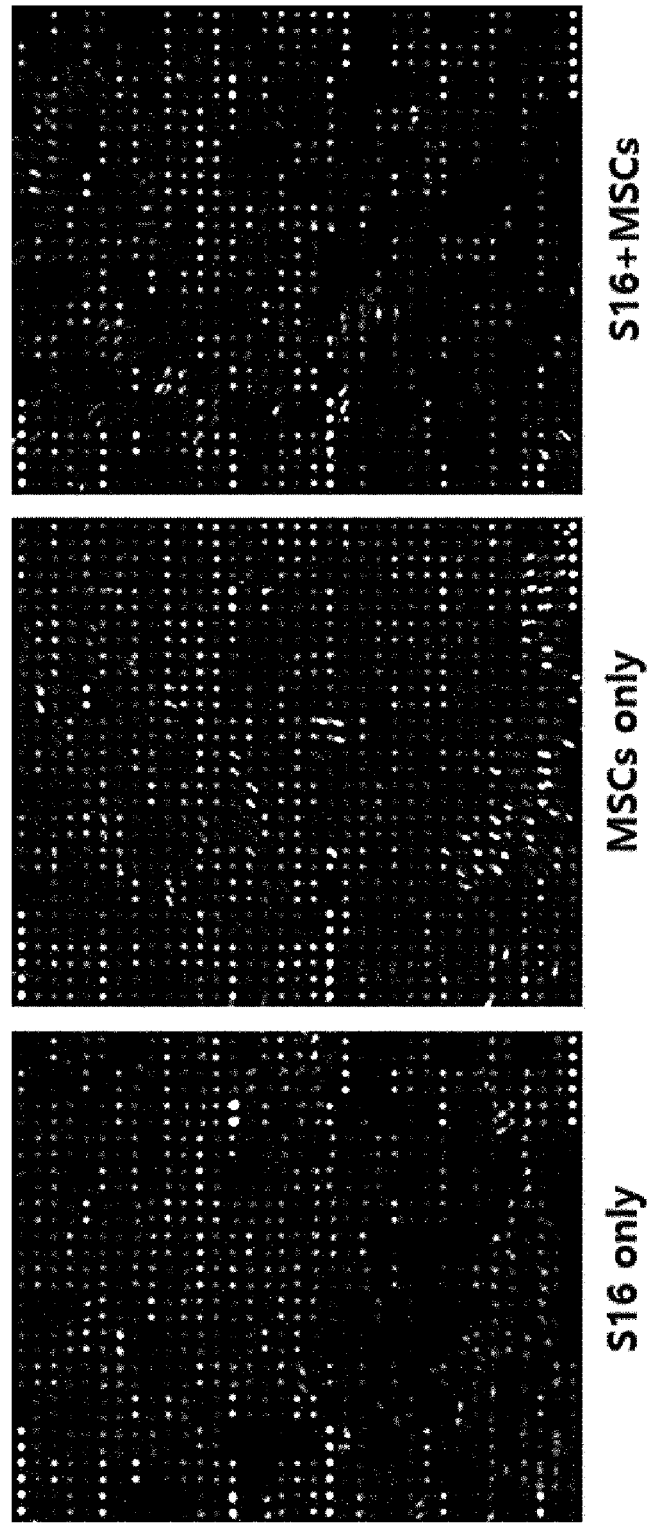
FIG. 3A illustrates images showing the screening results of insulin by analyzing secretory proteins increasing during the co-culture of tonsil-derived mesenchymal stem cells and Schwann cells according to an example of the present invention.

Example 3: Insulin Screening and Insulin Gene Expression Level 3-1. Secretory Proteins To find secretory substances promoting the proliferation of Schwann cells during co-culture of Schwann cells and tonsil-derived mesenchymal stem cells, antibody array was performed. Specifically, for protein analysis, a test was conducted using the RayBio Biotin Label-based Human Antibody Array (#AAH-BLG-1-4, RayBiotech, Inc., GA, USA), and slides were scanned by the Axon GenePix 4000B scanner (Molecular Devices, CA, USA) and analyzed using GenePix Pro 6.0 (Molecular Devices, CA, USA). The results are shown in FIG. 3A and Table 3. Through literature search, insulin was screened as a substance that has a possibility of inducing the proliferation of Schwann cells, and the results are shown in FIG. 3A and Table 3.

TABLE 3

| Antibody name | Genbank | Fold change |
| --- | --- | --- |
| TMEFF1/Tomoregulin-1 | NM_003692 | 2.03 |
| Insulin | NM_000207 | 1.82 |
| IL-22 | NM_020525 | 1.26 |
| PF4 | NM_002619 | 1.11 |
| EDA-A2 | NM_001399 | 1.10 |
| CXCR4 (Fusin) | NM_003467 | 1.06 |
| sFRP-4 | NM_003014 | 1.05 |
| CCR7 | NM_001838 | 1.05 |

3-2. Insulin Gene Expression Level

Figure 3B:
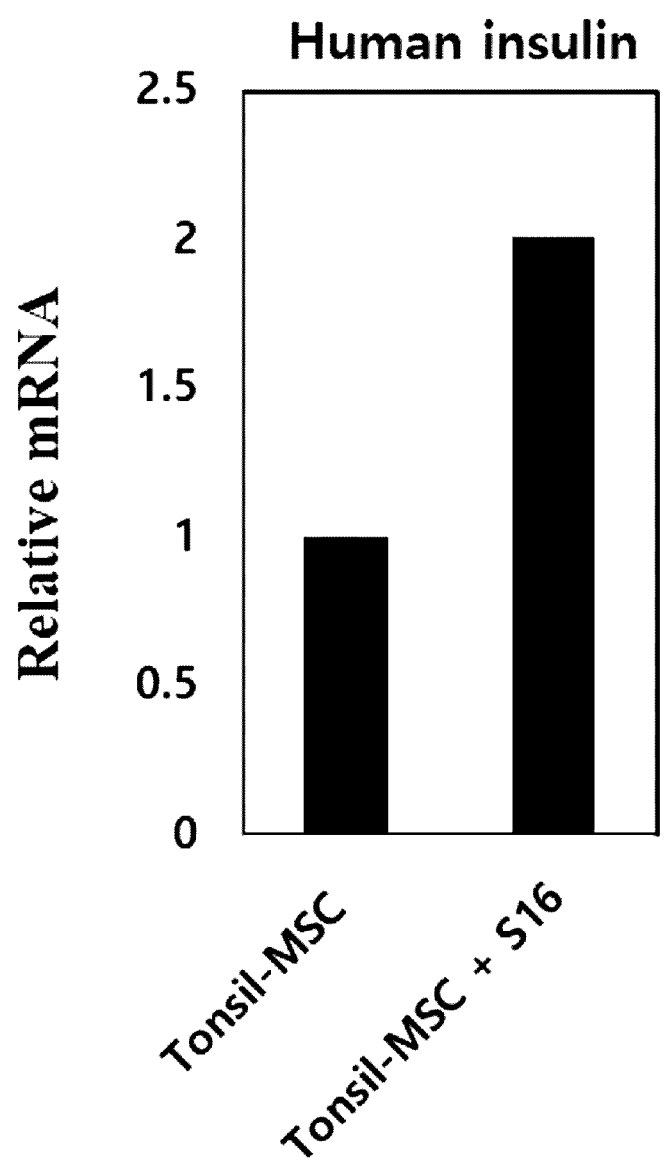
FIG. 3B illustrates a graph showing the comparison results of insulin gene expression of tonsil-derived mesenchymal stem cells during the co-culture of the mesenchymal stem cells with Schwann cells according to an example of the present invention.

The co-cultured mesenchymal stem cells were examined for insulin expression by the same method as in gene expression analysis through qRT-PCR using insulin primers in Example 2, and the results are shown in FIG. 3B and Table 4.

TABLE 4

| Human insulin | |
|---|---|
| Tonsil-MSC | 1 |
| Tonsil-MSC + S16 | 2.0 |

As can be confirmed from FIG. 3B and Table 4, the tonsil-derived mesenchymal stem cells and Schwann cells were co-cultured and analyzed for the insulin gene expression compared with the tonsil-derived mesenchymal stem cells, and as a result, the insulin gene expression was increased in the tonsil-derived mesenchymal stem cells co-cultured with Schwann cells.

Example 4: Increase in Proliferation Potency of Schwann Cells

The cultured Schwann cells were treated with insulin at 0, 1, 10, 50, 100, 200, 500, or 1000 nM, and then the degree of cell proliferation was determined by measurement of the absorbance at 450 nm using a spectrophotometer by using the CCK-8 (Dojindo) test method. ATP was measured using the CellTiter-Glo Luminescent Cell Viability Assay (Promega Corporation), and finally, 5-bromo-2'-deoxyuridine (BrdU) bound during DNA synthesis in cells was identified. In this test method, analysis was performed using Cell Proliferation ELISA, BrdU (colorimetric) (Roche). BrdU was added to the cells, followed by incubation for 24 hours, and then the cells were fixed, followed by DNA denaturation, and then treated with Anti-BrdU antibody. The cells were incubated with TMB substrate by using HRP-linked secondary antibody, and the absorbance at 370 nM was measured in a spectrophotometer. The results are shown in FIGS. 4A to 4C.

After the cultured Schwann cells were treated with 100 nM insulin protein, the cells were harvested after 24 hours, and then the pellets were added in RIPA buffer, and the cells were disrupted using a sonicator and then centrifuged at 13,000 rpm at 4° C. for 15 minutes. Only the supernatant was subjected to protein quantification, and then 30 μg of proteins was loaded onto SDS-PAGE gel. Thereafter, the gel loaded on PVDF was transferred and then blocked with 5% skim milk for 1 hour, and then P-ERK1/2, ERK1/2, P-AKT, AKT, and β-actin antibodies were attached thereto at 4° C. for 24 hours. After the HRP-linked secondary antibody reaction and the washing process were performed, the bands of proteins were checked by using ECL solution. The results are shown in FIG. 4.

Figure 4A:
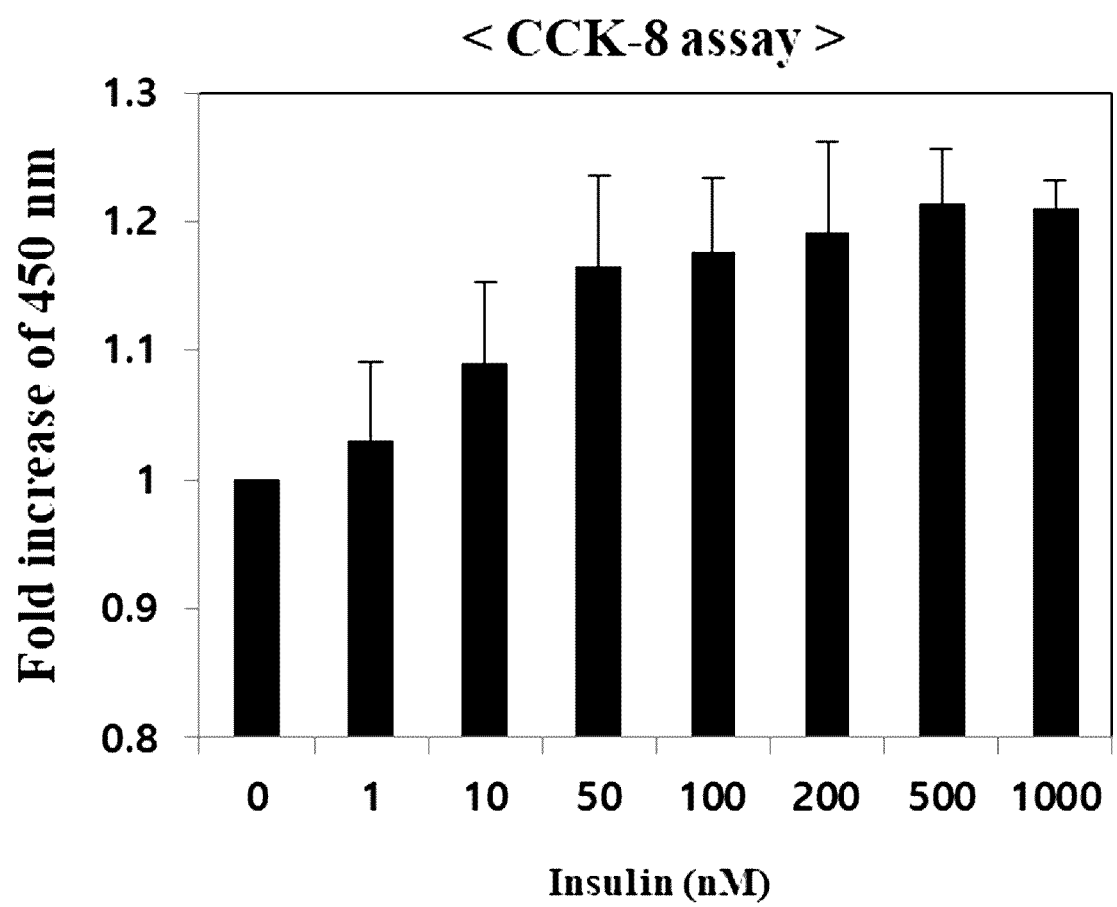
FIG. 4A illustrates a graph confirming an increase in the proliferation potency of Schwann cells when Schwann cells were treated with different concentrations of insulin protein according to an example of the present invention.
Figure 4B:
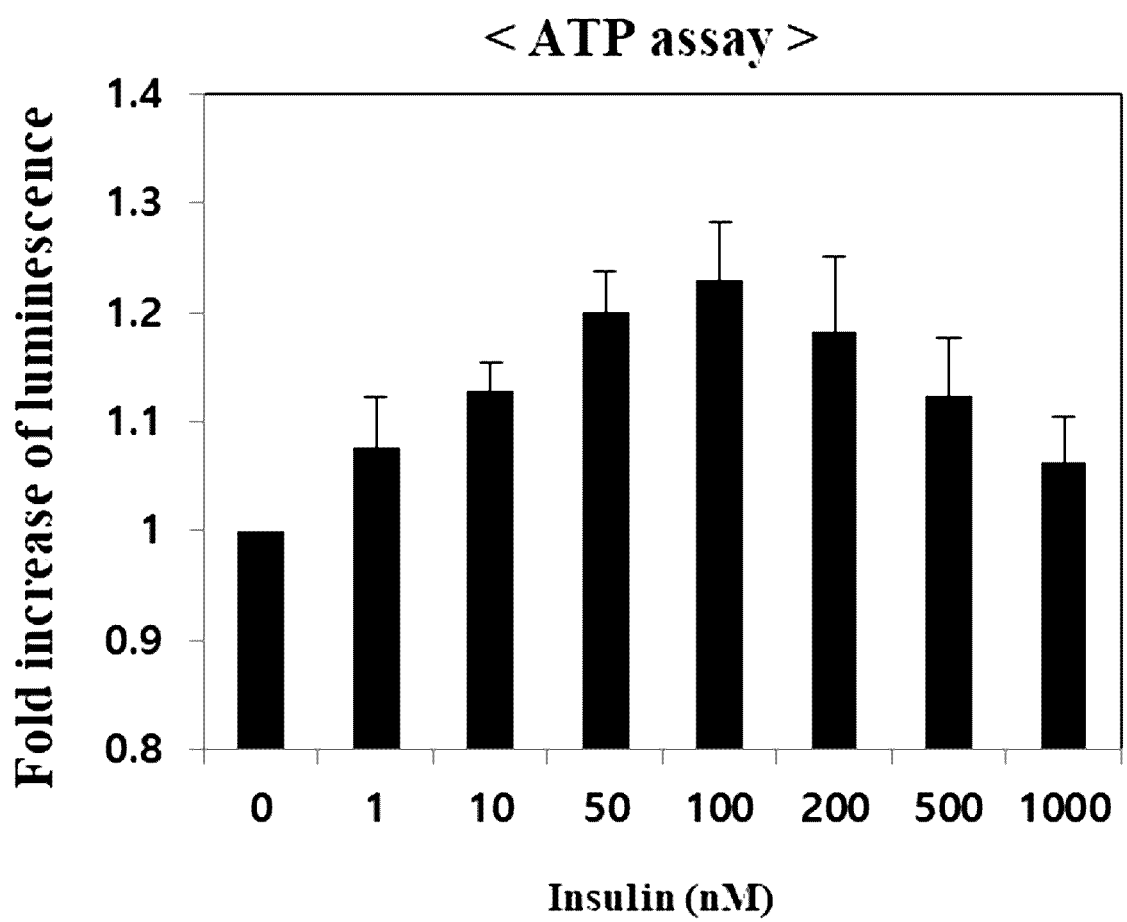
FIG. 4B illustrates a graph confirming an increase in the proliferation potency of Schwann cells when Schwann cells were treated with different concentrations of insulin protein according to an example of the present invention.
Figure 4C:
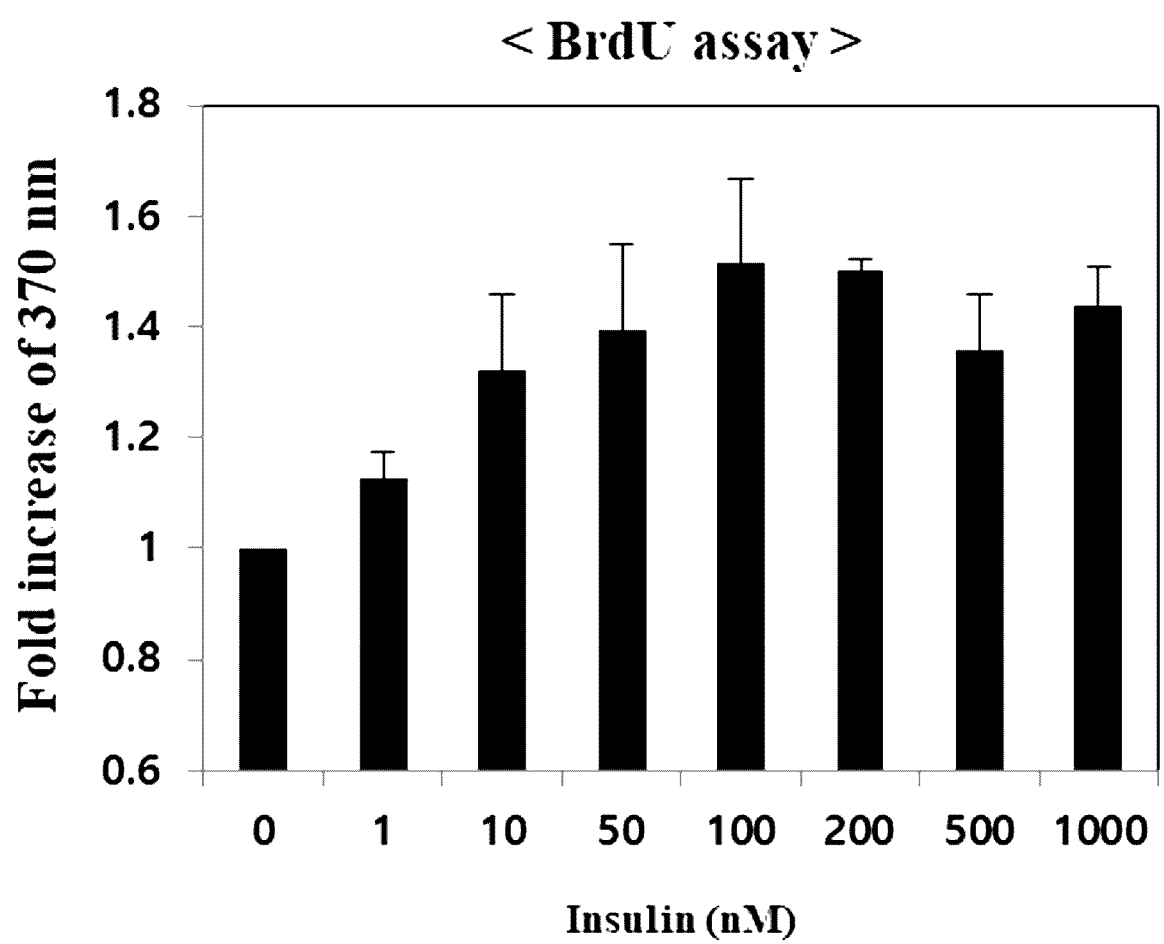
FIG. 4C illustrates a graph confirming an increase in the proliferation potency of Schwann cells when Schwann cells were treated with different concentrations of insulin protein according to an example of the present invention.

As can be confirmed from FIGS. 4A to 4C, the proliferation potency of Schwann cells was increased when the Schwann cells were treated with different concentrations of the insulin protein. It was confirmed that when Schwann cells was treated with 100 nM insulin proteins, such a concentration was determined to be an optimum concentration for increasing the proliferation capacity of Schwann cells.

Figure 4D:
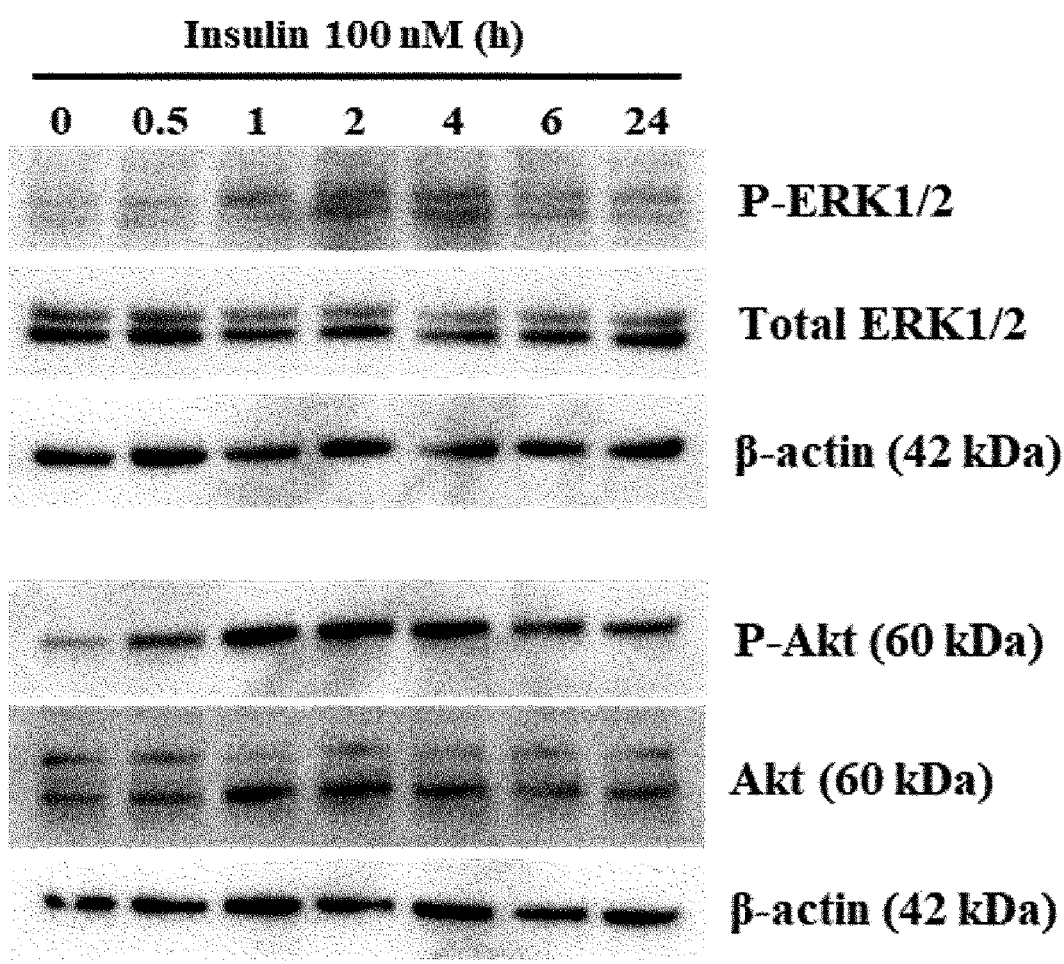
FIG. 4D illustrates an image confirming that the treatment of Schwann cells with 100 nM insulin protein activated the proliferation potency of Schwann cells through ERK and Akt pathways according to an example of the present invention.

As can be confirmed from FIG. 4D, the treatment of Schwann cells with 100 nM insulin activated the proliferation potency of Schwann cells through ERK and Akt pathways.

Example 5: Insulin Expression of Umbilical Cord-Derived Mesenchymal Stem Cells

Figure 5:
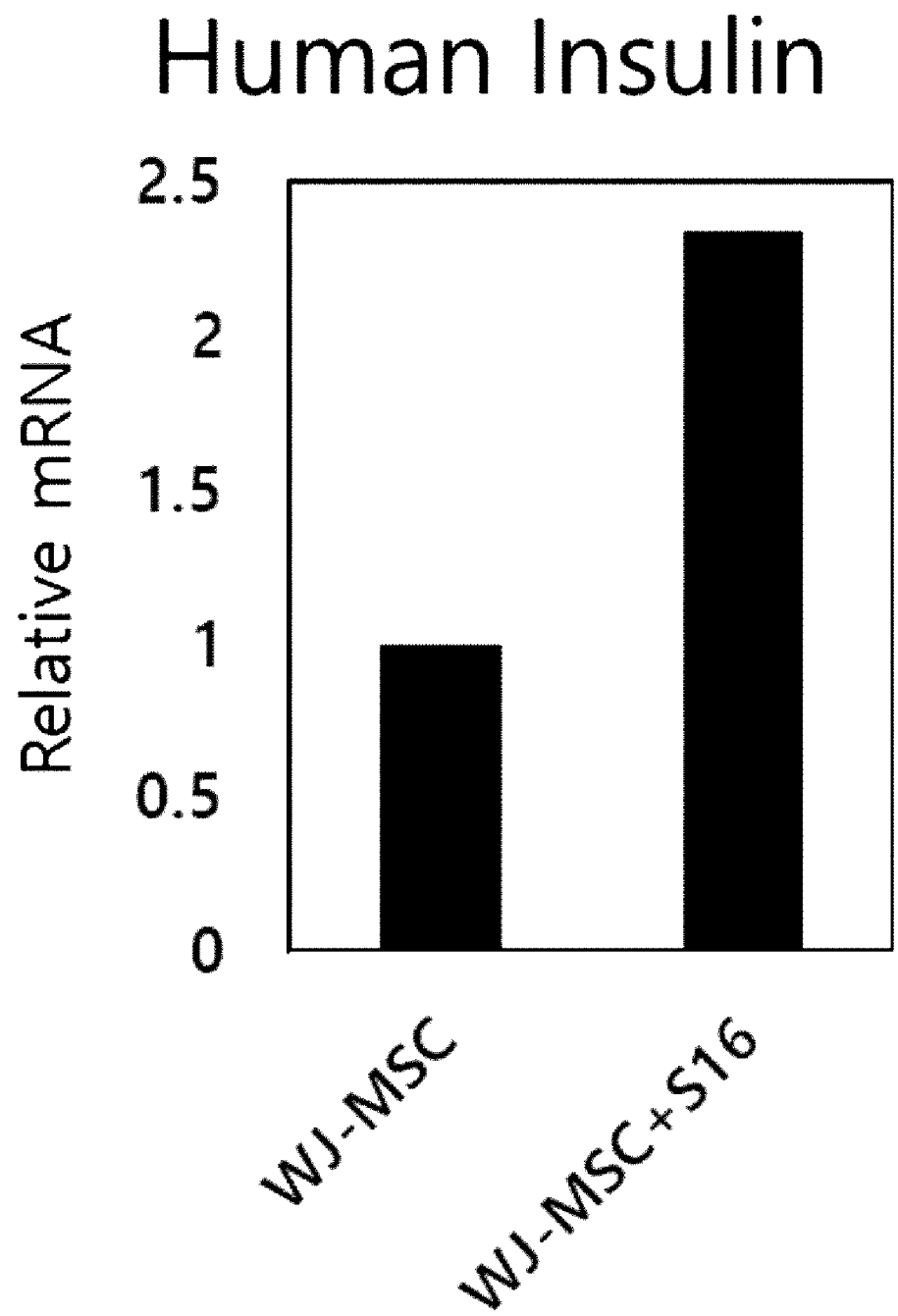
FIG. 5 illustrates a graph confirming an increase in insulin expression in umbilical cord-derived mesenchymal stem cells when the umbilical cord-derived mesenchymal stem cells were co-cultured with Schwann cells according to an example of the present invention.

The umbilical cord-derived mesenchymal stem cells co-cultured with Schwann cells were examined for insulin expression by the same method as in gene expression level analysis through qRT-PCR using insulin primers in Example 2, and the results are shown in FIG. 5 and Table 8.

TABLE 8

| Human insulin | |
|---|---|
| WK-MSC | 1 |
| WJ-MSC + S16 | 2.34 |

As can be confirmed from FIG. 5 and Table 8, umbilical cord (Wharton's Jelly)-derived mesenchymal stem cells as well as tonsil-derived mesenchymal stem cells showed an increase in insulin expression when co-cultured with Schwann cells.

Figure 6A:
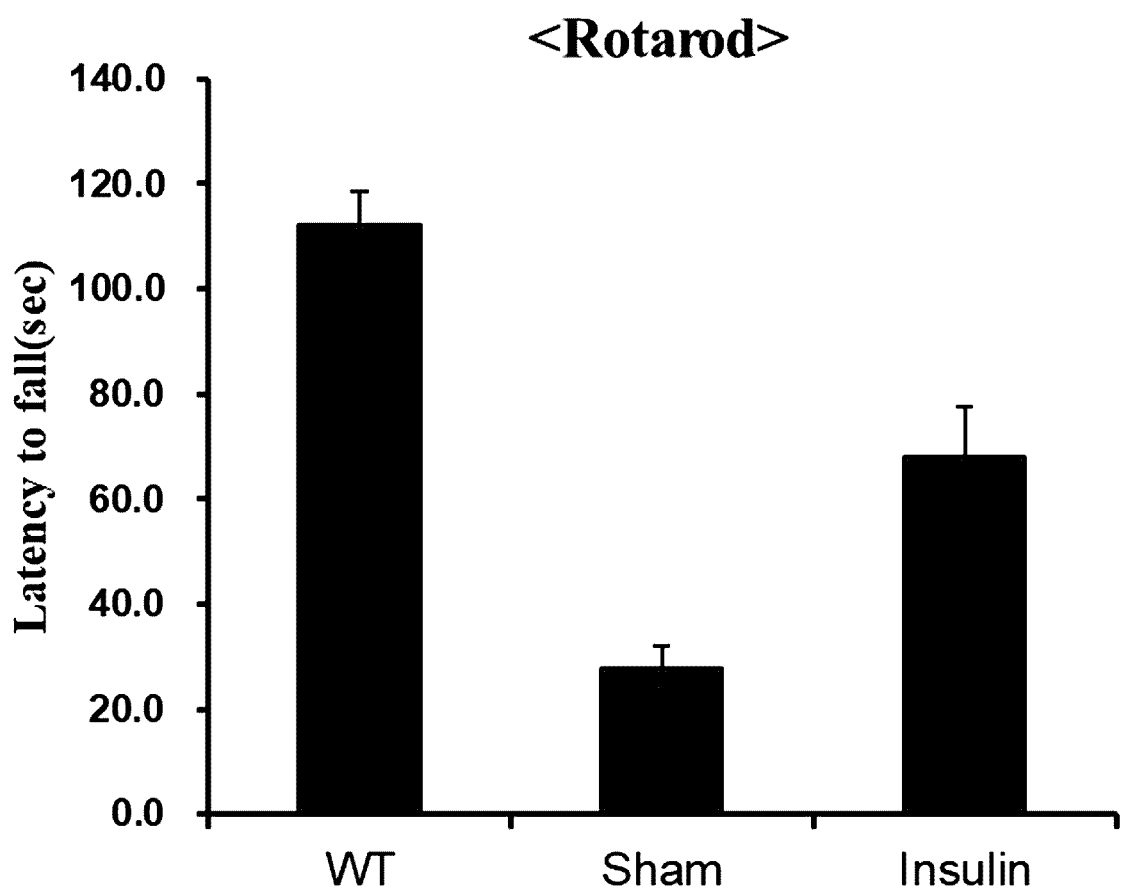
FIG. 6A illustrates a graph confirming an increase in rotarod behavioral performance when Charcot-Marie-Tooth disease mice were administered with insulin protein according to an example of the present invention.

Example 6: Increase in Behavioral Performance by Insulin in Disease Animal Model 5-Week-old Charcot-Marie-Tooth disease mice were intravenously administered with 12 U/kg insulin and, after two weeks, examined for behavioral performance increase through rotarod testing as in Example 5. The results are shown in FIG. 6A and Table 9.

TABLE 9

|  | WT | sham | insulin |
|---|---|---|---|
| Rotarod | 112.3 | 27.8 | 67.9 |

TABLE 5

|  | 0 nM | 1 nM | 10 nM | 50 nM | 100 nM | 200 nM | 500 nM | 1000 nM |
|---|---|---|---|---|---|---|---|---|
| CCK-8 | 1 | 1.03 | 1.09 | 1.16 | 1.18 | 1.19 | 1.21 | 1.21 |

TABLE 6

|  | 0 nM | 1 nM | 10 nM | 50 nM | 100 nM | 200 nM | 500 nM | 1000 nM |
|---|---|---|---|---|---|---|---|---|
| ATP | 1 | 1.08 | 1.13 | 1.20 | 1.23 | 1.18 | 1.22 | 1.06 |

TABLE 7

|  | 0 nM | 1 nM | 10 nM | 50 nM | 100 nM | 200 nM | 500 nM | 1000 nM |
|---|---|---|---|---|---|---|---|---|
| BrdU | 1 | 1.13 | 1.32 | 1.39 | 1.51 | 1.50 | 1.36 | 1.44 |

5-Week-old Charcot-Marie-Tooth disease mice were intravenously administered with 12 U/kg insulin and, after two weeks, examined for behavioral performance increase through grip strength testing as in Example 5. The results are shown in FIG. 6B and Table 10.

TABLE 10

|  | WT | sham | insulin |
|---|---|---|---|
| Grip Strength | 8.9 | 6.2 | 7.7 |

Figure 6B:
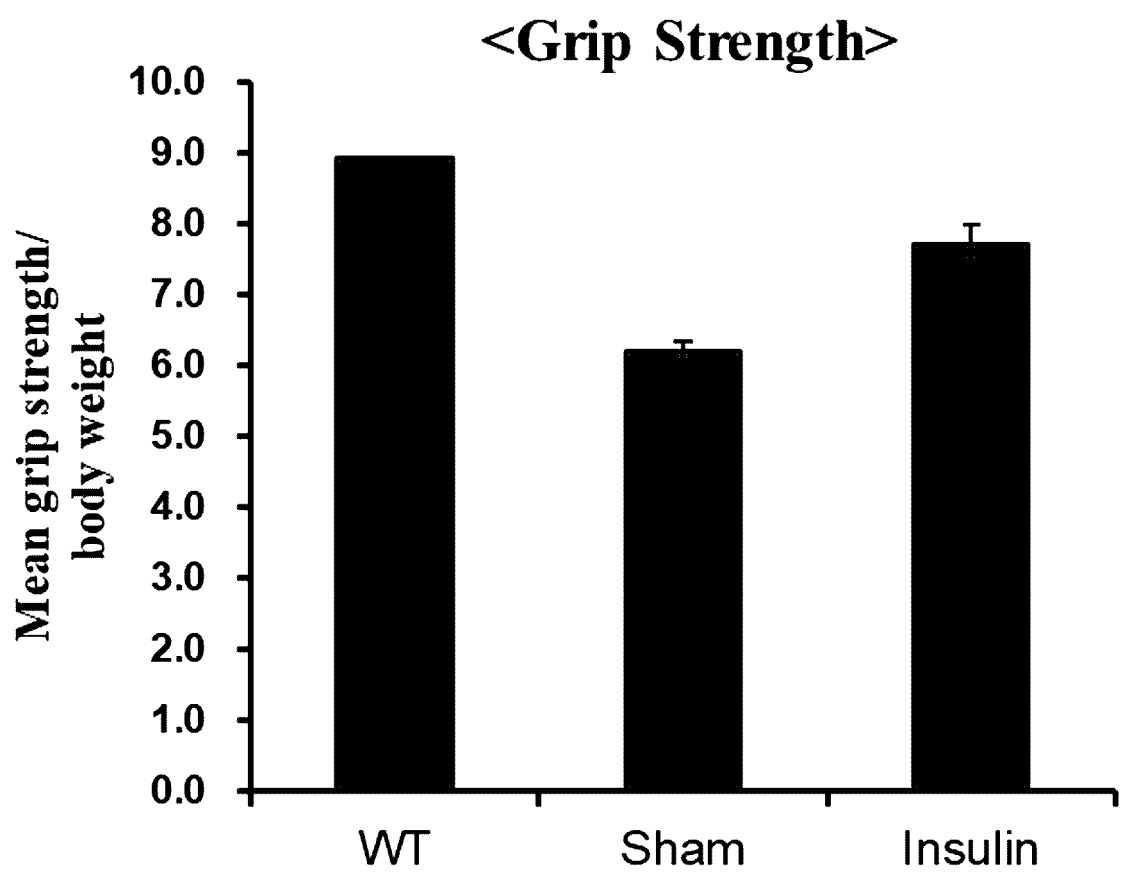
FIG. 6B illustrates a graph confirming an increase in grip strength behavioral performance when Charcot-Marie-Tooth disease mice were administered with insulin protein according to an example of the present invention.

As can be confirmed from FIGS. 6A and 6B and Table 10, the treatment of the diseases mice with insulin increased the behavioral performance of the mice.

Example 7: Reduction in PMP22 Gene Expression Level by Insulin in Disease Animal Model 5-Week-old Charcot-Marie-Tooth disease mice were intravenously administered with 12 U/kg insulin, and after two weeks, the sciatic nerve tissue was collected. Then, the PMP22 expression in the mouse nerve tissue was examined by the same method as in gene expression analysis through qRT-PCR using PMP22 primers in Example 2, and the results are shown in FIG. 7 and Table 11.

TABLE 11

|  | WT | sham | insulin |
|---|---|---|---|
| PMP22 | 1 | 1305.36 | 986.69 |

Figure 7:
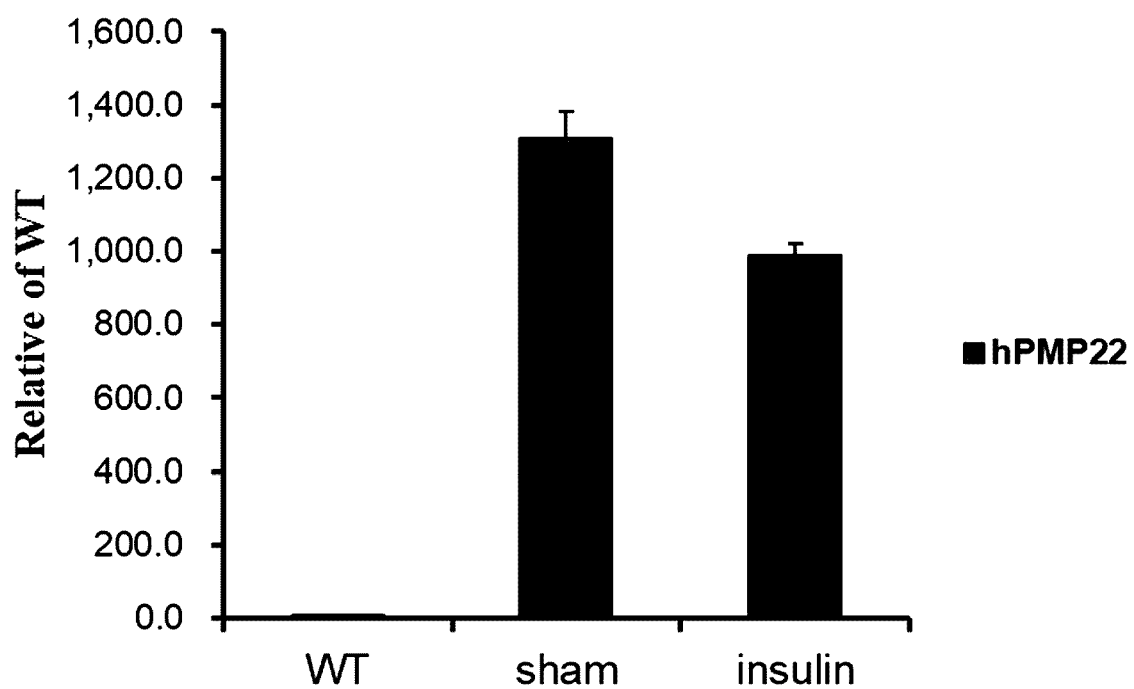
FIG. 7 illustrates a graph confirming a reduction in PMP22 gene expression when Charcot-Marie-Tooth disease mice were administered with insulin protein according to an example of the present invention.

As can be confirmed from FIG. 7 and Table 11, the administration of insulin to Charcot-Marie-Tooth disease mice reduced the PMP22 expression levels.

Figure 8A:
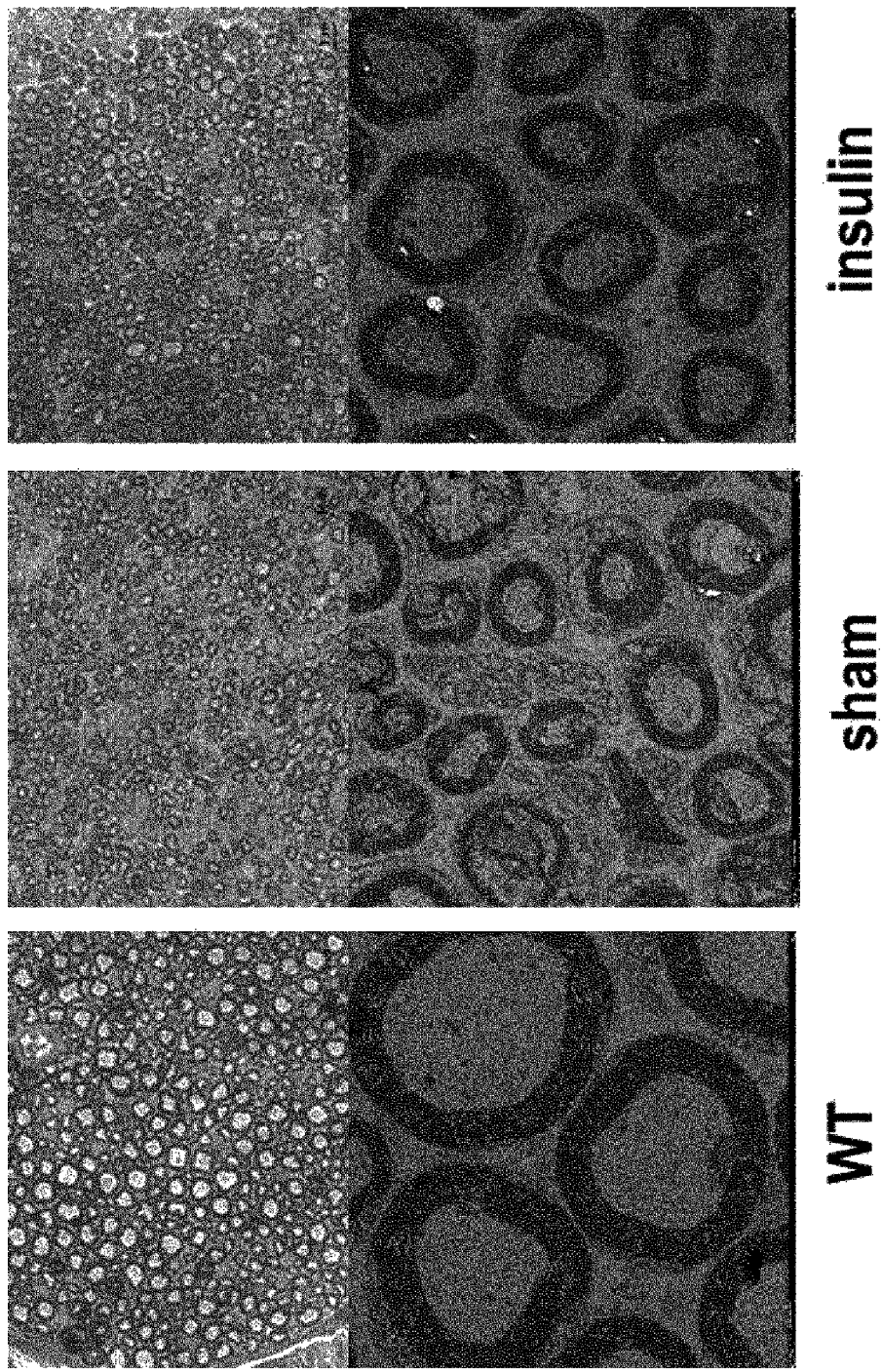
FIG. 8A illustrates images confirming an increase in myelination of the nerve tissue when Charcot-Marie-Tooth disease mice were administered with insulin protein according to an example of the present invention.
Figure 8B:
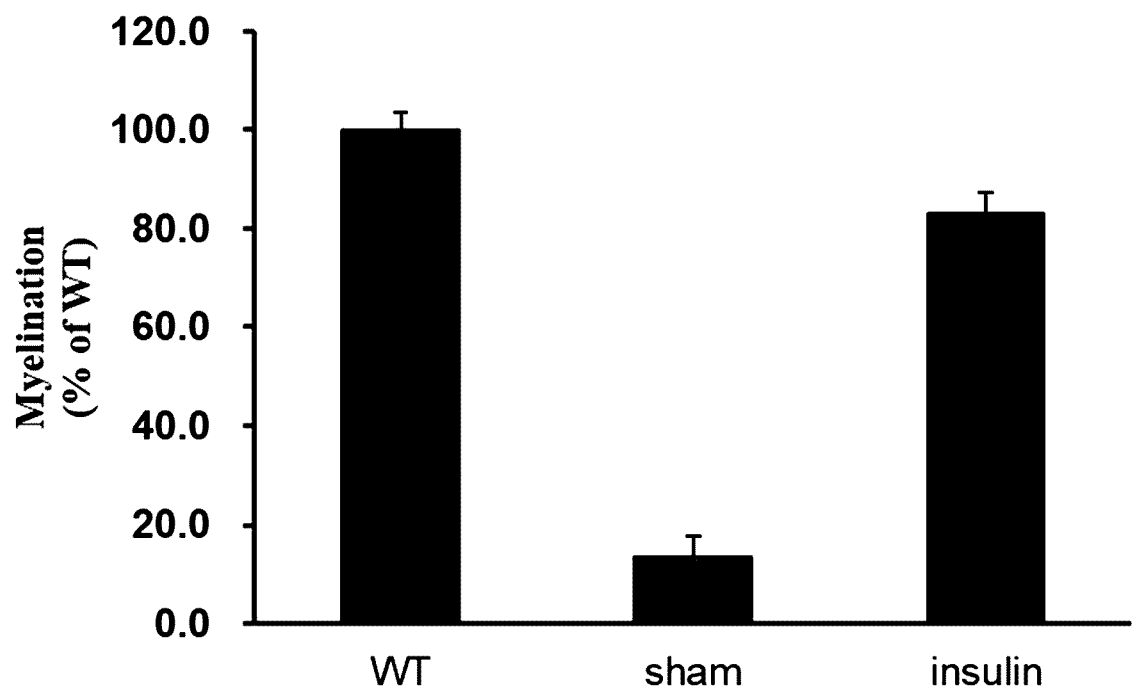
FIG. 8B illustrates a graph confirming an increase in myelination of the nerve tissue when Charcot-Marie-Tooth disease mice were administered with insulin protein according to an example of the present invention.
Figure 8C:
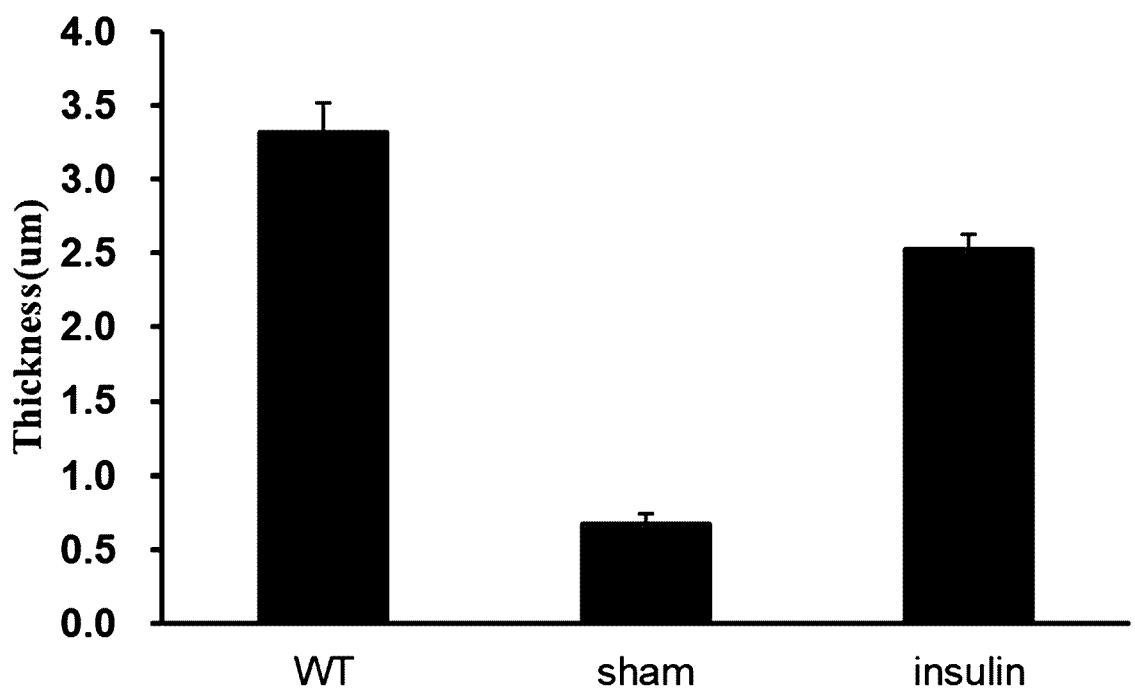
FIG. 8C illustrates a graph confirming an increase in thickness of myelination of the nerve tissue when Charcot-Marie-Tooth disease mice were administered with different concentrations of insulin protein according to an example of the present invention.

Example 8: Increase in Myelination of Nerve Tissue by Insulin in Disease Animal Model 5-Week-old Charcot-Marie-Tooth disease mice were intravenously administered with 12 U/kg insulin, and after two weeks, the sciatic nerve tissue was collected and observed by the same method as in the histological analysis through a transmission electron microscope in Example 7, and the results are shown in FIGS. 8A to 8C and Tables 12 and 13.

TABLE 12

|  | WT | sham | insulin |
|---|---|---|---|
| Myelination | 100 | 13.59 | 82.99 |

TABLE 13

|  | WT | sham | insulin |
|---|---|---|---|
| Thickness | 3.32 | 0.67 | 2.53 |

Figure 8D:
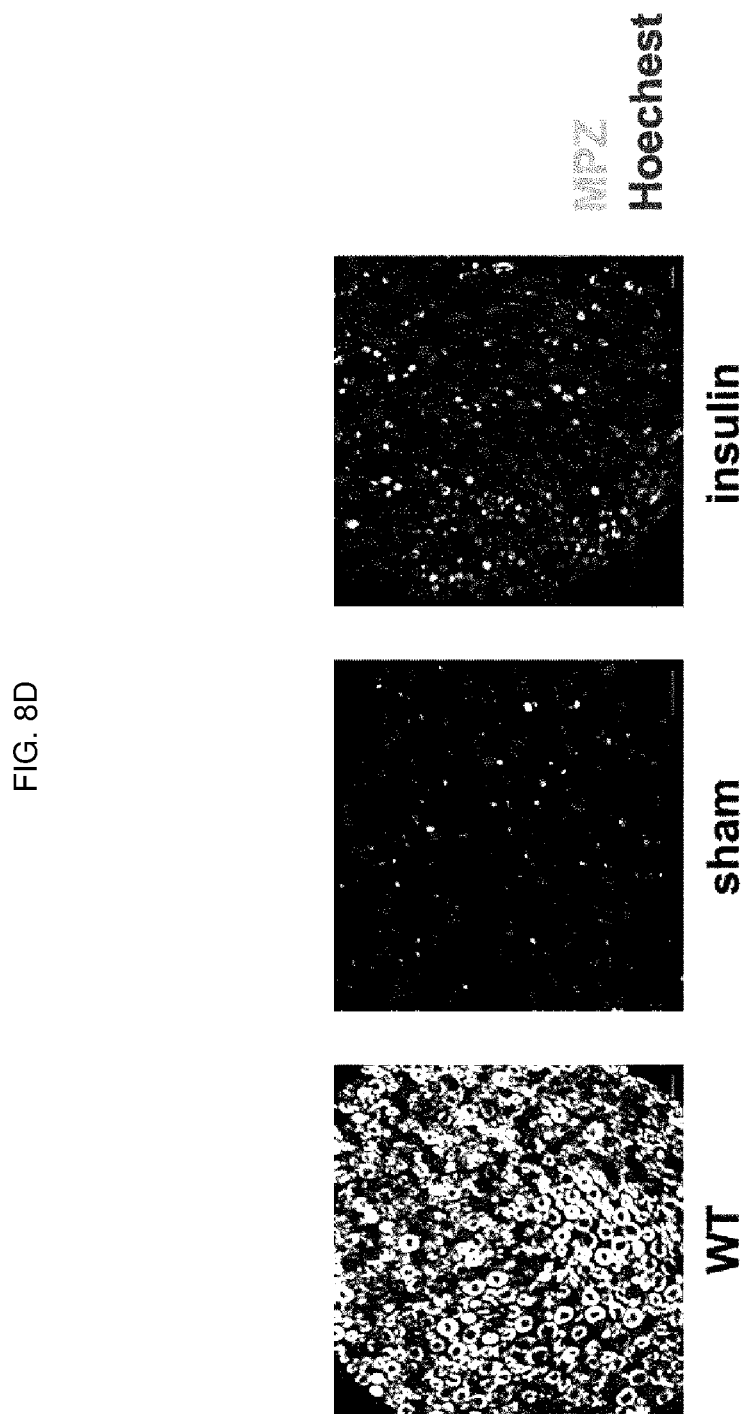
FIG. 8D illustrates images confirming an increase in myelination of the nerve tissue when Charcot-Marie-Tooth disease mice were administered with insulin protein according to an example of the present invention.
Figure 8E:
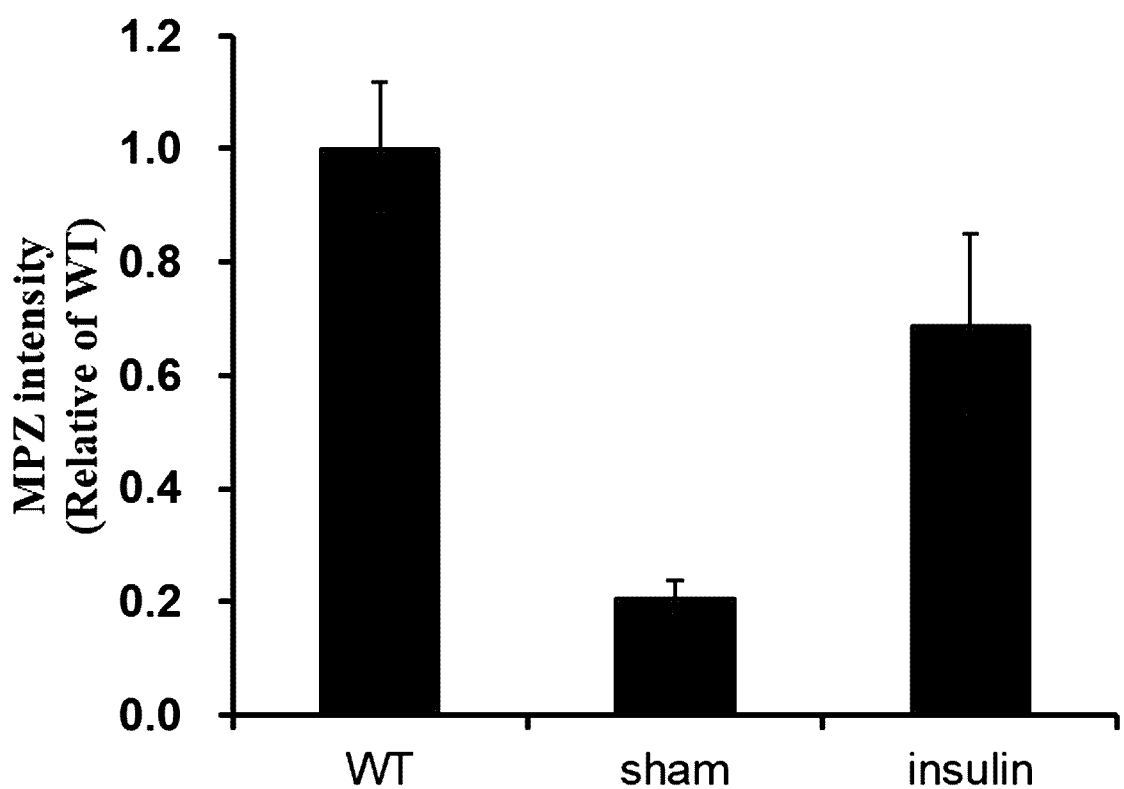
FIG. 8E illustrates a graph confirming an increase in myelination of the nerve tissue when Charcot-Marie-Tooth disease mice were administered with insulin protein according to an example of the present invention.

5-Week-old Charcot-Marie-Tooth disease mice were intravenously administered with 12 U/kg insulin, and after two weeks, the sciatic nerve tissue was collected and observed through a confocal microscope in Example 7, and the results are shown in FIG. 8D and Table 14.

TABLE 14

|  | WT | sham | insulin |
|---|---|---|---|
| MPZ | 1 | 0.20 | 0.69 |

Figure 8F:
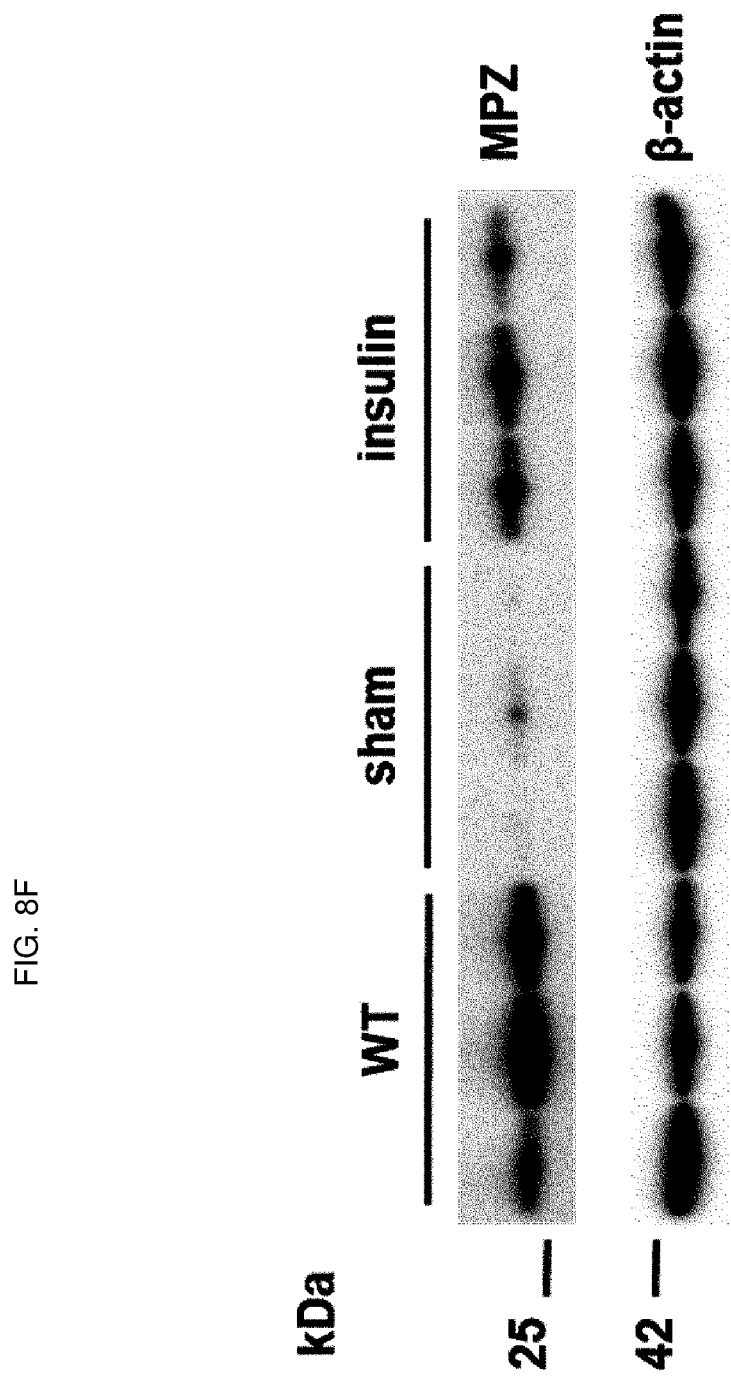
FIG. 8F illustrates images confirming an increase in myelination of the nerve tissue when Charcot-Marie-Tooth disease mice were administered with insulin protein according to an example of the present invention.
Figure 8G:
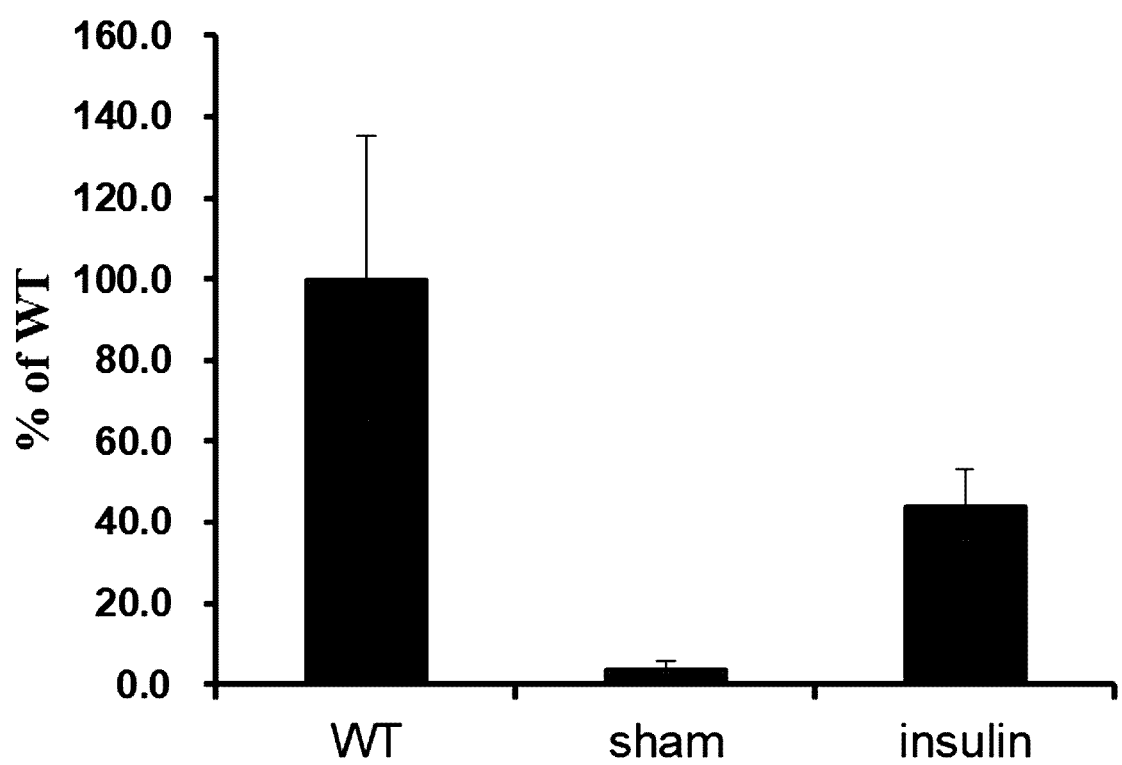
FIG. 8G illustrates a graph confirming an increase in myelination of the nerve tissue when Charcot-Marie-Tooth disease mice were administered with different concentrations of insulin protein according to an example of the present invention.

5-Week-old Charcot-Marie-Tooth disease mice were intravenously administered with 12 U/kg insulin, and after two weeks, the sciatic nerve tissue was collected and then the MPZ expression level was determined using MPZ antibody by the same method as in protein expression analysis through western blotting in Example 3, and the results are shown in FIGS. 8F and 8G and Table 15.

TABLE 15

|  | WT | sham | insulin |
|---|---|---|---|
| MPZ | 100 | 3.84 | 44.12 |

As can be confirmed from FIGS. 8A to 8G, the administration of insulin to Charcot-Marie-Tooth disease mice increased myelination.

Figure 9A:
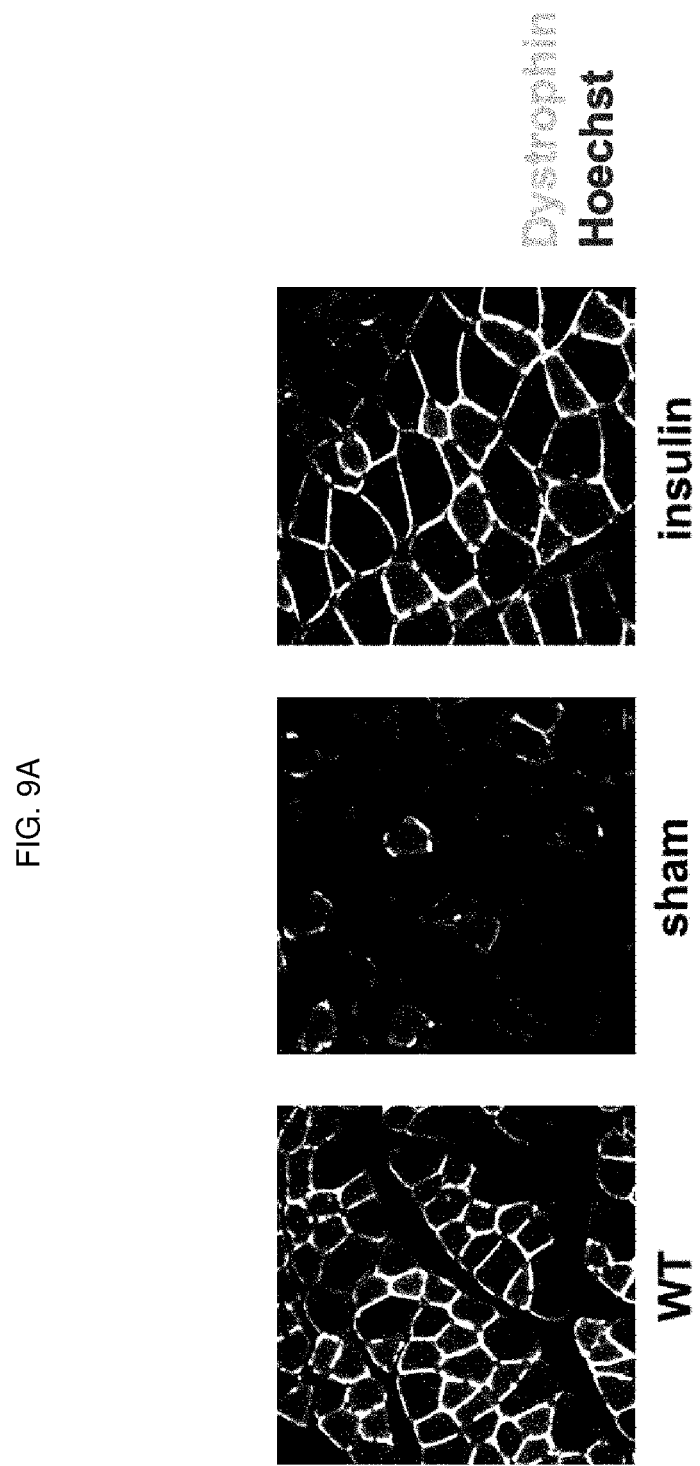
FIG. 9A illustrates images confirming an increase in myogenesis of the gastrocnemius muscle tissue when Charcot-Marie-Tooth disease mice were administered with insulin protein according to an example of the present invention.
Figure 9B:
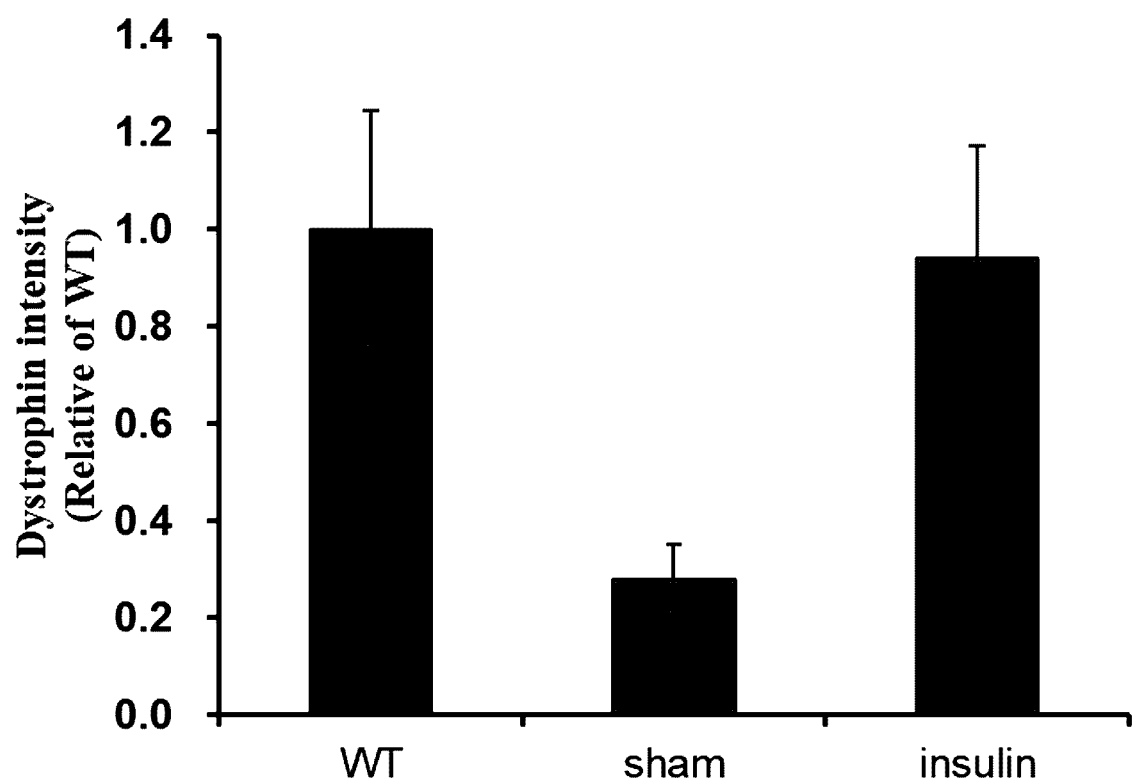
FIG. 9B illustrates a graph confirming an increase in myogenesis of the gastrocnemius muscle tissue when Charcot-Marie-Tooth disease mice were administered with insulin protein according to an example of the present invention.

Example 9: Increase in Myogenesis of Muscle Tissue by Insulin in Disease Animal Model 5-Week-old Charcot-Marie-Tooth disease mice were intravenously administered with 12 U/kg insulin, and after two weeks, the gastrocnemius muscle tissue was collected. Then, the increase in myogenesis was measured using the dystrophin antibody by the same method as in protein expression analysis using a fluorescent antibody in Example 7, and the results are shown in FIGS. 9A and 9B and Table 16.

TABLE 16

|  | WT | sham | insulin |
|---|---|---|---|
| Dystrophin | 1 | 0.27 | 0.94 |

Figure 9C:
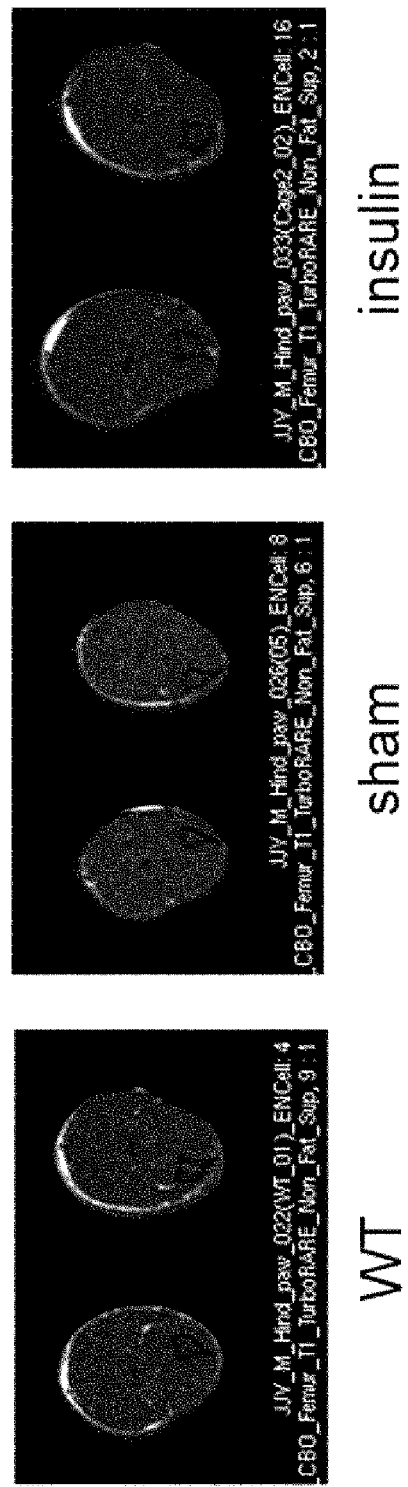
FIG. 9C illustrates images confirming an increase in myogenesis of the gastrocnemius muscle tissue when Charcot-Marie-Tooth disease mice were administered with insulin protein according to an example of the present invention.
Figure 9D:
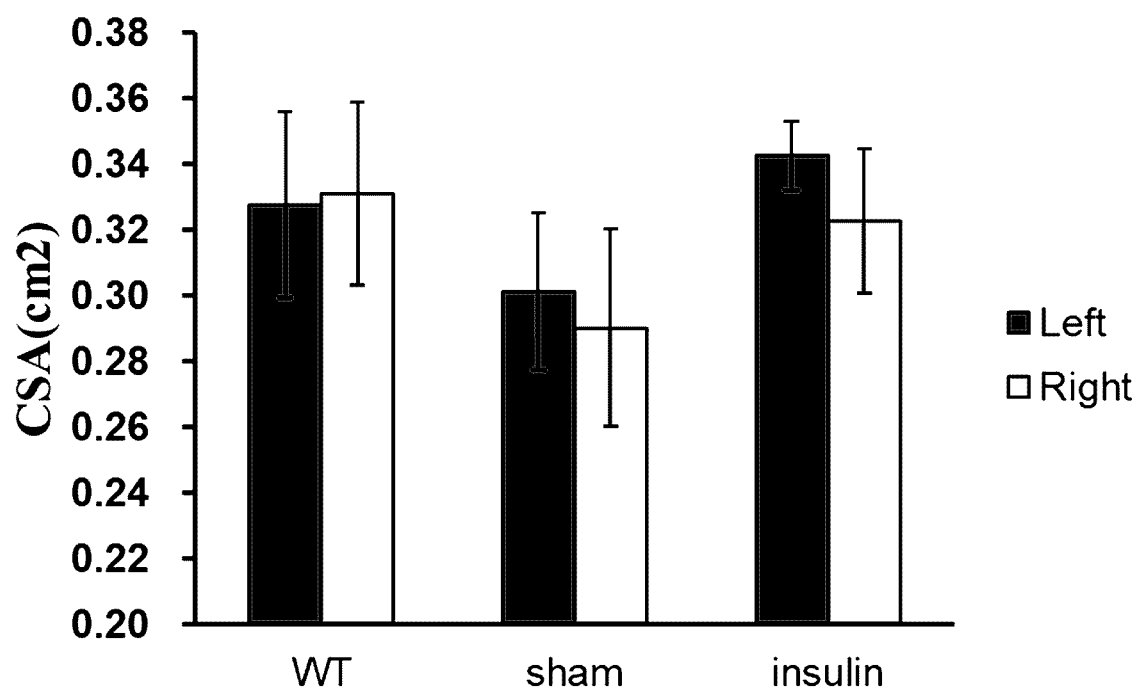
FIG. 9D illustrates a graph confirming an increase in myogenesis of the gastrocnemius muscle tissue when Charcot-Marie-Tooth disease mice were administered with insulin protein according to an example of the present invention.
Figure 9E:
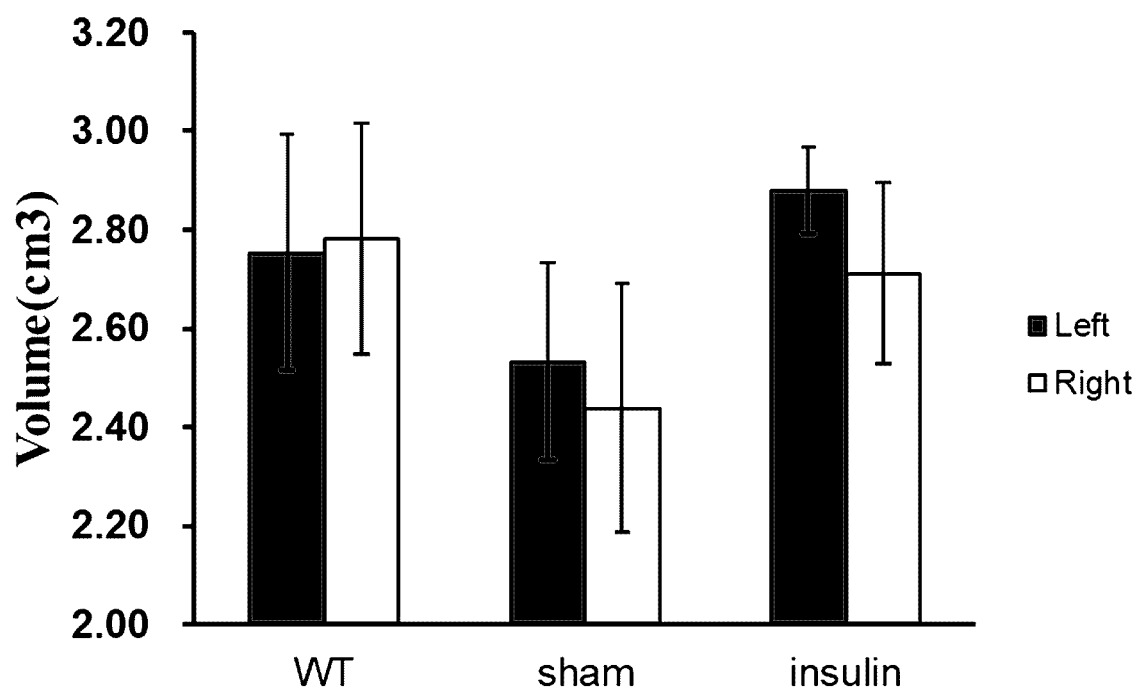
FIG. 9E illustrates a graph confirming an increase in myogenesis of the gastrocnemius muscle tissue when Charcot-Marie-Tooth disease mice were administered with insulin protein according to an example of the present invention.

5-Week-old Charcot-Marie-Tooth disease mice were intravenously administered with 12 U/kg insulin and, after two weeks, the gastrocnemius muscle tissue was observed by the MRI system. The results are shown in FIG. 9C. In addition, the cross-sectional area of the muscle tissue was measured to obtain the volume of the muscle tissue, and the results are shown in FIG. 9E and Table 18.

TABLE 17

|  | WT | | sham | | insulin | |
|---|---|---|---|---|---|---|
|  | Left | Right | Left | Right | Left | Right |
| CSA | 0.328 | 0.331 | 0.302 | 0.290 | 0.343 | 0.323 |

TABLE 18

|  | WT | | sham | | insulin | |
|---|---|---|---|---|---|---|
|  | Left | Right | Left | Right | Left | Right |
| Volume | 2.754 | 2.782 | 2.533 | 2.438 | 2.879 | 2.712 |

As can be confirmed from FIGS. 9A to 9E, the administration of insulin to Charcot-Marie-Tooth disease mice increased myogenesis.

INDUSTRIAL APPLICABILITY

The present invention is directed to a pharmaceutical composition containing mesenchymal stem cells or insulin secreted from mesenchymal stem cells for preventing or treating Charcot-Marie-Tooth disease.

What is claimed is:

1. A method for treating Charcot-Marie-Tooth disease in a subject in need thereof, comprising:
    administering to the subject a composition comprising tonsil-derived or umbilical cord-derived mesenchymal stem cells,
    wherein the tonsil-derived or umbilical cord-derived mesenchymal stem cells have insulin secretory capacity enhanced by co-culture with Schwann cells.

2. The method of claim 1, wherein the mesenchymal stem cells contain insulin.

3. The method of claim 1, wherein the mesenchymal stem cells are derived from a human tonsil or human umbilical cord.

4. A method for treating Charcot-Marie-Tooth disease in a subject in need thereof, comprising:
    administering to the subject a composition comprising insulin or a derivative thereof as an active ingredient,
    wherein the insulin is secreted from tonsil-derived or umbilical cord-derived mesenchymal stem cells,
    wherein the tonsil-derived or umbilical cord-derived mesenchymal stem cells have insulin secretory capacity enhanced by co-culture with Schwann cells.

5. The method of claim 4, wherein the mesenchymal stem cells are derived from a human tonsil or human umbilical cord.

* * * * *